US012559385B2

(12) United States Patent
Braman et al.

(10) Patent No.: US 12,559,385 B2
(45) Date of Patent: Feb. 24, 2026

(54) MAGNETIC NANOPARTICLES FOR SAMPLE SEPARATION

(71) Applicant: Agilent Technologies, Inc., Santa Clara, CA (US)

(72) Inventors: Jeffrey Carl Braman, Carlsbad, CA (US); Natalia Novoradovskaya, San Diego, CA (US); David Long, Glen Mills, PA (US); Bruce Richter, Wilmington, DE (US); Derick Lucas, Wilmington, DE (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 17/640,721

(22) PCT Filed: Sep. 30, 2021

(86) PCT No.: PCT/US2021/052974
§ 371 (c)(1),
(2) Date: Mar. 4, 2022

(87) PCT Pub. No.: WO2023/055385
PCT Pub. Date: Apr. 6, 2023

(65) Prior Publication Data
US 2024/0025759 A1     Jan. 25, 2024

(51) Int. Cl.
*C01G 49/08*       (2006.01)
*B82Y 25/00*       (2011.01)
(Continued)

(52) U.S. Cl.
CPC ........... *C01G 49/08* (2013.01); *H01F 1/0054* (2013.01); *H01F 1/445* (2013.01); *B82Y 25/00* (2013.01);
(Continued)

(58) Field of Classification Search
CPC .............................. H01F 1/0054; C01G 49/08
See application file for complete search history.

(56) References Cited

U.S. PATENT DOCUMENTS

| | | |
|---|---|---|
| 2009/0050839 A1 | 2/2009 | Chen et al. |
| 2011/0064675 A1 | 3/2011 | Hadjipanayis et al. |

(Continued)

FOREIGN PATENT DOCUMENTS

| | | |
|---|---|---|
| CN | 103400677 A | 11/2013 |
| CN | 104209106 B | 4/2016 |

(Continued)

OTHER PUBLICATIONS

Quy et al., "Synthesis of Silica -Coated Magnetic Nanoparticles and Application in the Detection of Pathogenic Viruses", Journal of Nanomaterials, vol. 2013, Article ID 603940, 6 pgs, Jul. 16, 2013.*

(Continued)

*Primary Examiner* — C Melissa Koslow
(74) *Attorney, Agent, or Firm* — Lando & Anastasi, LLP

(57) ABSTRACT

Silica-coated magnetic nanoparticles with greater ability to remain dispersed, and methods of making and using silica-coated magnetic nanoparticles. The magnetic nanoparticles comprise a core and a coating, where the core comprises $Fe_3O_4$ or other magnetic material and the coating has a thickness of from about 1.5 nm to about 2 nm. The magnetic nanoparticles are useful for preparing nucleic acids for analysis, by separating nucleic acids from other components and by normalizing nucleic acid concentrations.

4 Claims, 23 Drawing Sheets

Synthesis of Magnetic $Fe_3O_4$ Nanoparticles

(51) Int. Cl.
    *H01F 1/00*       (2006.01)
    *H01F 1/44*       (2006.01)
(52) U.S. Cl.
    CPC ...... *C01P 2004/64* (2013.01); *C01P 2004/84*
    (2013.01); *C01P 2006/12* (2013.01); *C01P*
    *2006/42* (2013.01)

(56) References Cited

U.S. PATENT DOCUMENTS

| | | | |
|---|---|---|---|
| 2011/0130616 A1 | 6/2011 | Seeney et al. | |
| 2011/0274832 A1 | 11/2011 | Dai et al. | |
| 2013/0089614 A1 | 4/2013 | Zhang et al. | |
| 2015/0252361 A1 | 9/2015 | Hayden et al. | |
| 2015/0357102 A1* | 12/2015 | Rowe .................... | H01F 1/0018 |
| | | | 252/62.59 |
| 2016/0046987 A1 | 2/2016 | Kim et al. | |
| 2016/0348094 A1* | 12/2016 | Park .......................... | H01F 1/06 |
| 2018/0130579 A1 | 5/2018 | Ramanujan et al. | |
| 2019/0241885 A1 | 8/2019 | Hennig et al. | |
| 2020/0024592 A1 | 1/2020 | Park et al. | |
| 2020/0038839 A1 | 2/2020 | Silvestre et al. | |
| 2020/0041502 A1 | 2/2020 | Bolle et al. | |

FOREIGN PATENT DOCUMENTS

| | | | |
|---|---|---|---|
| CN | 107952081 | * | 4/2018 |
| CN | 112892577 A | | 6/2021 |

OTHER PUBLICATIONS

Kang et al., "Synthesis and Characterization of Nanometer-Size Fe3O4 and gamma-Fe2O3 Particles", Chem. Mater., vol. 8, No. 9, 1996, pp. 2209-2211. Sep. 12, 1996.*

Axygen Biosciences, et al., "AxyPrepTM Mag PCR Normalizer Protocol," Axygen Biosciences, 5 pages.

Laurent, Sophie et al., "Magnetic Iron Oxide Nanoparticles: Synthesis, Stabilization, Vectorization, Physicochemical Characterizations, and Biological Applications," Chemical Reviews, vol. 108, No. 6, Jun. 11, 2008, 2064-2110.

Lee, Jinwoo et al., "Simple Synthesis of Functionalized Superparamagnetic Magnetite/Silica Core/Shell Nanoparticles and Their Application As Magnetically Separable High-Performance Biocatalysts," Small, vol. 4, No. 1, 2008, 143-152.

Liu, D et al., "Morphology and Properties of Silica-Based Coatings With Different Functionalities For Fe3O4, ZnO and Al2O3 Nanoparticles," RSC Adv., vol. 5, May 20, 2015, 48094-48103.

Lu, An-Hui et al., "Magnetic Nanoparticles: Synthesis, Protection, Functionalization, and Application," Angew. Chem., vol. 46, Int. Ed. 2007, 2007, 1222-1244.

Massart, Rene et al., "Preparation of Aqueous Magnetic Liquids in Alkaline and Acidic Media," IEEE Transactions on Magnetics, vol. MAG-17, No. 2, Mar. 1981, 1247-1248.

Philipse, Albert P. et al., "Magnetic Silica Dispersions: Preparation and Stability of Surface-Modified Silica Particles With a Magnetic Core," Langmuir, vol. 10, No. 1, 1994, 92-99.

Strathearn, Katherine E et al., "Axygen® AxyPrep™ Mag PCR Normalizer Kit Effectively and Efficiently Normalizes PCR Products, Genomic DNA, and Plasmid DNA from Multiple Samples," SnAPPShots a brief technical report from the Corning Applications Group, 4 pages.

Wu, Wei et al., "Recent Progress On Magnetic Iron Oxide Nanoparticles: Synthesis, Surface Functional Strategies and Biomedical Applications," Science and Technology of Advanced Materials, vol. 16, No. 023501, Apr. 28, 2015, 44 pages.

Lee, Alex H. F. et al., "Preparation of Iron Oxide Silica Particles For Zika Viral RNA Extraction," Heliyon, vol. 4, article No. e00572, 2018, 16 pages.

Meng, Cheng et al., "Preparation of Amino-Functionalized Fe3O4@mSiO2 Core-Shell Magnetic Nanoparticles and Their Application For Aqueous Fe3+ Removal," Journal of Hazardous Materials, vol. 341, Jan. 5, 2018, 198-206.

PCT, "Notification of Transmittal of The International Search Report & Written Opinion mailed on Jun. 22, 2022," Application No. PCT/US2021/052974, 13 pages.

Quy, Dao V. et al., "Synthesis of Silica-Coated Magnetic Nanoparticles and Application in the Detection of Pathogenic Viruses," Journal of Nanomaterials, vol. 2013, Article No. 603940, 2013, 1-6.

PCT, "Notification of Transmittal of The International Search Report and Written Opinion mailed on Jan. 25, 2023," Application No. PCT/US2022/077402, 12 pages.

Supplemental Partial European Search Report for EP Application No. 22 87 7635.7 completed Jul. 1, 2025.

Kim, D.K., et al., "Characterization and MRI study of surfactant-coated superparamagnetic nanoparticles administered into the rat brain," Journal of Magnetism and Magnetic Materials, vol. 225, No. 1-2: 256-261 (2001).

Bian, P., et al., "Materials Property Evaluation of SiO2 Film Coated on Magnetite Nanoparticles," Microprocesses and Nanotechnology, 172-173 (2007).

* cited by examiner

Synthesis of Magnetic Fe₃O₄ Nanoparticles $$2\,FeCl_3 + FeCl_2 \text{ in } H_2O \xrightarrow[H_2O]{NH_4OH} Fe_3O_4 \text{ NPs}$$

2.50          0.919                                                                ~ 1.07

$$( Fe^{2+} + 2Fe^{3+} + 8OH^- = Fe_3O_4 + 4H_2O )$$

$$\sim 1.07\,g \;\; 20\,nm\; Fe_3O_4\,NPs \xrightarrow[EtOH\,/\,H_2O\,/\,NH_4OH]{TEOS \text{ in } EtOH} Silica@Fe_3O_4\,NPs$$

100

10-15 nm                          20-30 nm

Final particle size
depends on
amount of silica
deposited on core.

MAGNETIC NANOPARTICLES FOR SAMPLE SEPARATION

CROSS-REFERENCE TO RELATED APPLICATIONS

This application is a national stage entry pursuant to 35 U.S.C. § 371 of International Application No. PCT/US2021/052974, filed on Sep. 30, 2021, which is incorporated herein by reference in its entirety.

FIELD OF THE INVENTION

The present invention relates to a silica-coated magnetic nanoparticles (NP), compositions comprising such magnetic nanoparticles, and methods of separating analytes from biological samples using such magnetic nanoparticles and compositions.

BACKGROUND OF THE INVENTION

Magnetic particles possessing a variety of surface modifications are used to separate molecules from biological samples for further analysis and processing. The molecules to be analyzed are separated from other components in the sample by inducing the binding of desired molecules to magnetic particles, applying an external magnetic field to capture molecules-bound particles from the rest of the sample, washing the particles to remove contaminants and finally recovery of the desired molecules using water or low ionic strength buffer.

Magnetic particles used for separation of biomolecules usually possess at their core magnetic iron oxide. Magnetic iron oxide particles are generally present as magnetite ($Fe_3O_4$), maghemite ($\gamma$-$Fe_2O_3$) or hematite ($Fe_2O_3$). The magnetic particles can be coated with silica, for example, and assume a wide particle size distribution from tens to hundreds of nanometers to multiple-microns. Many synthetic methods for creating silica coated magnetic particles result in materials with poorly defined (uneven) silica surfaces and/or produce aggregates that settle out of suspension making them difficult to process. As a result, particles mixing prior to and during a protocol is required to ensure maximum biomolecules binding and recovery of high purity material.

More specifically, silica coated magnetic particles can be used to isolate nucleic acids from a biological sample. The first example of capturing nucleic acids from a sample using silica was demonstrated by Vogelstein [Vogelstein, B. and Gillespie, D., Proc. Nalt. Acad. Sci. USA, 76 (2) 615-619, 1979]. He discovered that nucleic acids would bind tenaciously to silica glass in the presence of a chaotropic salt. Bound nucleic acids could be washed with aqueous organic solvent to remove contaminants while the nucleic acids remained bound to the silica. Nucleic acids were subsequently released from the silica when exposed to low ionic strength buffer. Developing a reproducible synthetic method creating very small silica coated "nanoparticles" (such as those having a size in the range 10-15 nm) would allow nucleic acids to be captured on silica surfaces, washed free of contaminants and then eluted in low ionic strength buffer without the attendant problem of aggregation and subsequent settling.

Nanoparticles described above could be used for a variety of nucleic acid purification protocols. For example, a diagnostic method could be developed relying on enrichment of RNA from SARS-CoV-2 virus, the etiological agent of Covid-19 illness. The resulting RNA could be detected by quantitative reverse transcription polymerase chain reaction (QRT-PCR). A wide variety of other viral and bacterial infectious agents such as Flu-A, Flu-B and *Legionella* (causing legionellosis), respectively, could be detected using a variety of analytic tools if provided with highly purified NP-based nucleic acids.

Additionally, Next-Generation Sequencing (NGS) protocols could be streamlined, resulting in higher sample throughput by using NP to normalize variable concentration DNA or RNA "NGS libraries". Next generation sequencing platforms generally require use of a specific concentration of nucleic acids to be loaded onto the sequencing instrument. The data obtained from running the sequencing instrument depends on the initial concentration. Too low of a concentration of nucleic acid results in low sequence data output while loading too high of a concentration results in low quality sequence data or unusable data.

There are several existing approaches to normalize variable concentration nucleic acids for NGS. These include nucleic acid quantification by spectrophotometry, fluorimetry, quantitative PCR, or electrophoresis followed by calculation of desired concentrations and then dilution of all samples to a normalized concentration. Other approaches for nucleic acid normalization include kits sold by Corning Life Sciences and others. The Corning "AxyPrep Mag PCR Normalizer" protocol states that 10 μL of bead mixture has a binding capacity of 200 ng of input library DNA. The protocol advises that "To minimize the variability within each data point, the input DNA must be at least 3-4 times higher than the desired DNA amount. For example, if your desired elution DNA concentration is 2 ng/μL, then your sample input must be at least 8 ng/μL". Achieving these quantities of library DNA, e.g. 400 ng DNA from a 50 μL library recovery volume or 200 nM concentration, in a sequencing project is very difficult. This is especially true if the DNA used for NGS library synthesis is of poor quality such as DNA characteristically recovered from formalin-fixed paraffin embedded (FFPE) samples.

Agilent Technologies, Inc. (Santa Clara, CA) currently offers kits for creating Next Generation Sequencing libraries such as the "SureSelectXT Target Enrichment System". The SureSelectXT methods create libraries with total non-normalized DNA quantities ranging from 10 nM to approximately 50 nM. These DNA quantities are presumed to be too low to enable use of the AxyPrep Mag PCR Normalizer kit.

The use of nucleic acid-based diagnostics and sequencing in research and medical diagnostics is growing, but preparation of nucleic acids prior to analysis is a significant cost component of nucleic acid analytical techniques such as real-time PCR, genetic sequencing, and hybridization testing. Sample preparation delays test results and limits the ability to run these assays to laboratories with well trained personnel. Current sample preparation processes are laborious, time consuming and require laboratory capability.

There remains a need for magnetic nanoparticles and compositions that simplify and reliably produce purified nucleic acids from a wide variety of sample types for diagnostic and research applications.

SUMMARY OF THE INVENTION

As one aspect of the present technology, a stable aqueous dispersion of magnetic particles is provided. The magnetic particles comprise clusters of individual magnetic nanoparticles, and each of the individual magnetic nanoparticles comprises a magnetic core and a homogeneous conformal coating on the core. The homogeneous conformal coating has a thickness from about 1.5 nm to about 2 nm. The individual magnetic nanoparticle have an average total diameter from about 10 to about 15 nm. The clusters have an average cluster size the dispersion from about 50 to about 190 nm.

As another aspect of the present technology, methods of making silica-coated magnetic nanoparticles are provided. $Fe_3O_4$ nanoparticles are provided in an alcohol mixture, and a silicate solution is added while sonicating the mixture. The thickness of the silica coating on the magnetic nanoparticles may be adjusted by changing the amount of silicate added.

In some examples, the present method excludes oxygen during the $Fe_3O_4$ coprecipitation reaction to minimize/eliminate the formation of unwanted $Fe_2O_3$. In some examples, the coating thickness is selected to (1) protect the $Fe_3O_4$ core from further oxidation to $Fe_2O_3$, (2) fully cover the magnetic core, and (3) prevent particles aggregation thus maximizing nucleic acid purification efficiency and minimizing non-specific binding. It has been found that coating thickness and surface area are important parameters regarding use and efficiency of the present magnetic particles for purification of nucleic acids from biological samples.

In another aspect, methods are provided for preparing nucleic acids for analysis. The methods comprise the steps of combining a sample comprising nucleic acids with a binding medium and a magnetic nanoparticle composition as described herein in a vessel, binding of the nucleic acids to the coating of the magnetic nanoparticles, separating NP from liquid within the vessel by use of a magnetic field, removal of liquid from the vessel and the nucleic acid-bound magnetic nanoparticles are retained within the vessel, contacting the nucleic acid-bound magnetic nanoparticles with a washing solution to remove contaminants while the magnetic nanoparticles remain attracted to the magnet or are dispersed and then re-attrackted by the magnetic field followed by removal of the wash solution, and finally adding an elution medium and collection of released nucleic acids from the magnetic nanoparticles. The nucleic acids are removed from the vessel thereby providing a nucleic acid preparation.

As another aspect of the present invention, methods are provided for obtaining RNA from a biological sample and preparing the RNA for analysis. The methods comprise placing a biological sample comprising RNA in a vessel, wherein the biological sample is a cell or a virus. The biological sample is contacted with guanidine thiocyanate (GTC) and Proteinase K to form a sample mixture, which is incubated at an elevated temperature for a sample preparation period. Neat alcohol and a magnetic nanoparticle composition (embodiments of which are described herein) are added to the sample mixture in the vessel. The methods also comprise mixing the sample mixture and the magnetic nanoparticles and incubating for a second incubation period and then applying a magnetic force to separate the magnetic nanoparticles from a supernatant within the vessel. The supernatant is removed from the vessel without disturbing the separated magnetic nanoparticles, which are washed one or more times with an alcohol solution. The separated magnetic nanoparticles are dried, and an elution medium is added to the vessel and mixed with the magnetic nanoparticles. After an elution period in which RNA is eluted from the magnetic nanoparticles to form an eluate, the eluate is removed from the vessel.

These and other features and advantages of the present methods and compositions will be apparent from the following detailed description, in conjunction with the appended claims.

The present teachings are best understood from the following detailed description when read with the accompanying drawing figures. The features are not necessarily drawn to scale.

DETAILED DESCRIPTION

The silica-coated magnetic nanoparticles (NP) described herein are surprisingly effective for separating nucleic acids from a sample. The silica coating provides a hydrophilic substrate, greatly reducing non-specific binding in important applications, such as purification of nucleic acids.

In some embodiments, the present technology is used for enrichment of RNA obtained from cellular or viral samples as part of a quantitative reverse transcription polymerase chain reaction (QRT-PCR) detection assay. By way of example, the present technology can be employed to enrich RNA from SARS-CoV-2 or other viral pathogens prior to detecting the RNA by QRT-PCR. In some embodiments, the present technology is used for enrichment of human RNA and human and bacterial DNA. For example, the present technology may be used to enrich and detect DNA from respiratory pathogens such as *Legionella* (Legionnaires' disease pathogen). In some embodiments, the present technology is used for normalization of a DNA library prior to Next Generation Sequencing (NGS). In some embodiments, the present technology is used for normalization of a DNA or RNA sample prior to analysis of the sample.

Figure 1A:
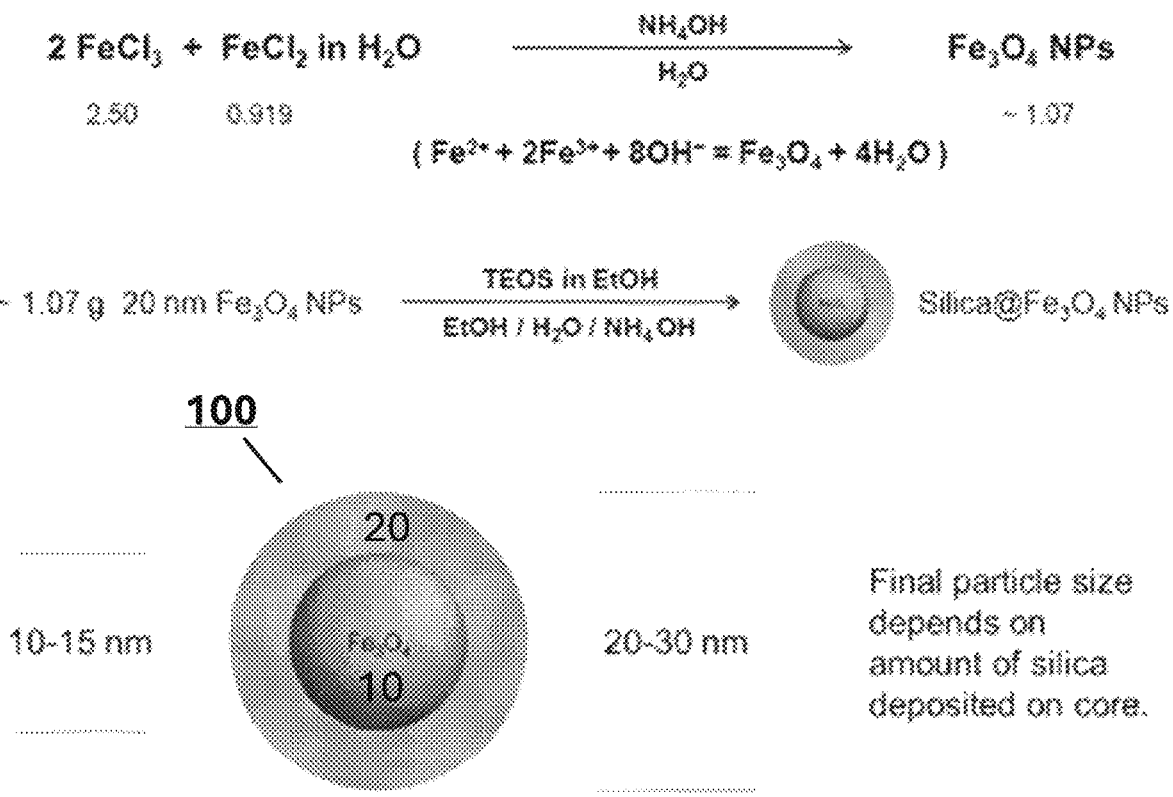
FIGS. 1A and 1B are illustrations of an embodiment of the preparation of silica-coated magnetic nanoparticles according to the present technology.

Magnetic Nanoparticles Referring to FIG. 1A, the present technology provides a magnetic nanoparticle 100 comprising a core 10 and a homogeneous conformal coating 20 on the core 10 that substantially encapsulates the core 10. In one example, the coating 20 completely encapsulates the core 10. The core 10 can be made of a metal, an alloy, or a metal oxide and the coating can be made of silica. In an example, the core 10 can be $Fe_3O_4$ and the coating comprises silica. In an example, the silica coating is substantially non-porous. The ratio of the core diameter to the coating thickness and the characteristics of the coating surface may be such that a plurality of the magnetic nanoparticles 100 aggregate in a manner that allows an analyte in a sample solution to bind on the surface of the coating of the magnetic nanoparticles 100. The magnetic nanoparticles 100 having the analytes binded on its coated surface can then be rapidly removed from the sample solution by applying a magnetic field to the sample solution having the magnetic nanoparticles 100.

Figure 1B:
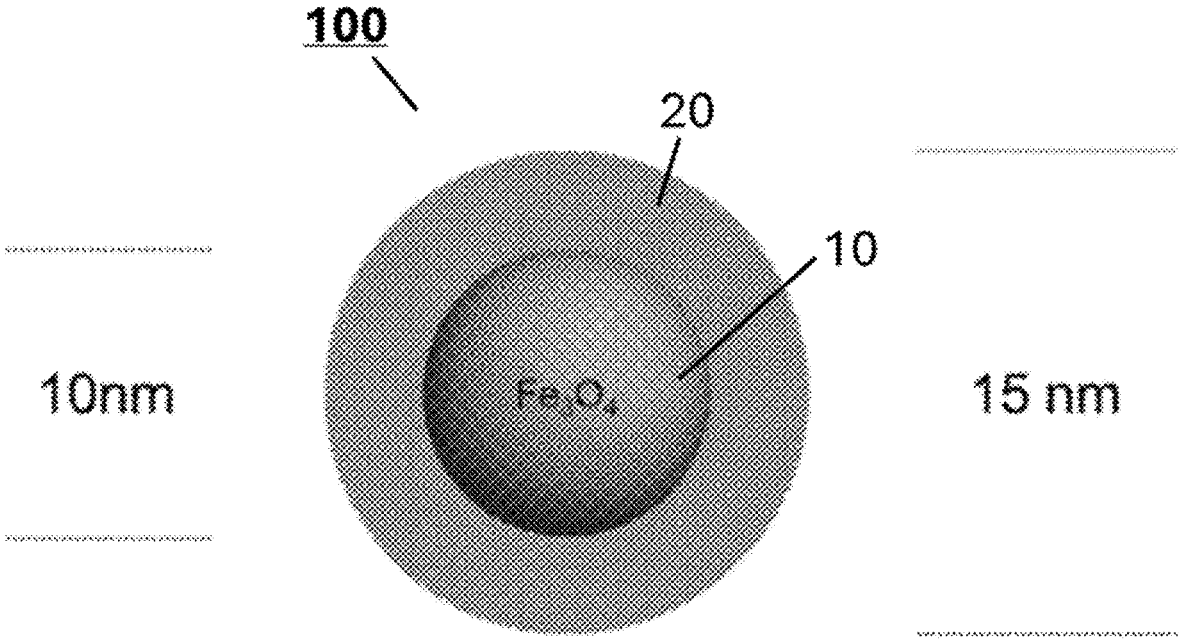

FIG. 1A illustrates an embodiment of the preparation of the present magnetic nanoparticles 100. The magnetic nanoparticle 100 can include a core diameter to coating thickness ratio of from about 60:1 to about 30:5. For example, the core diameter to coating thickness can be in a ratio of about 30:6, such as 10:1, 20:3, 10:2, 30:3, or 30:4. In one example the magnetic nanoparticle 100 can include a size of from about 9 nm to about 40 nm, such 40 nm, such as from about 20 nm to about 30 nm. The core 10 can include a diameter of from about 5 nm to about 20 nm, such as from about 7 nm to about 15 nm or less, for example from about 10 nm to about 15 nm or less, such as about 8.8 nm or less, about 8 nm or less, or about 7.9 nm. The coating 20 substantially encapsulating the core 10. In some examples, the coating 20 can include a thickness of from about 0.5 nm to about 7.5 nm, from about 1 nm to about 2 nm, for example, from about 1.5 nm to about 2 nm. FIG. 1B illustrates the magnetic nanoparticle 100 having a particle size of about 15 nm with a coating thickness of about 2.5 nm.

Figures 2A, 2B:
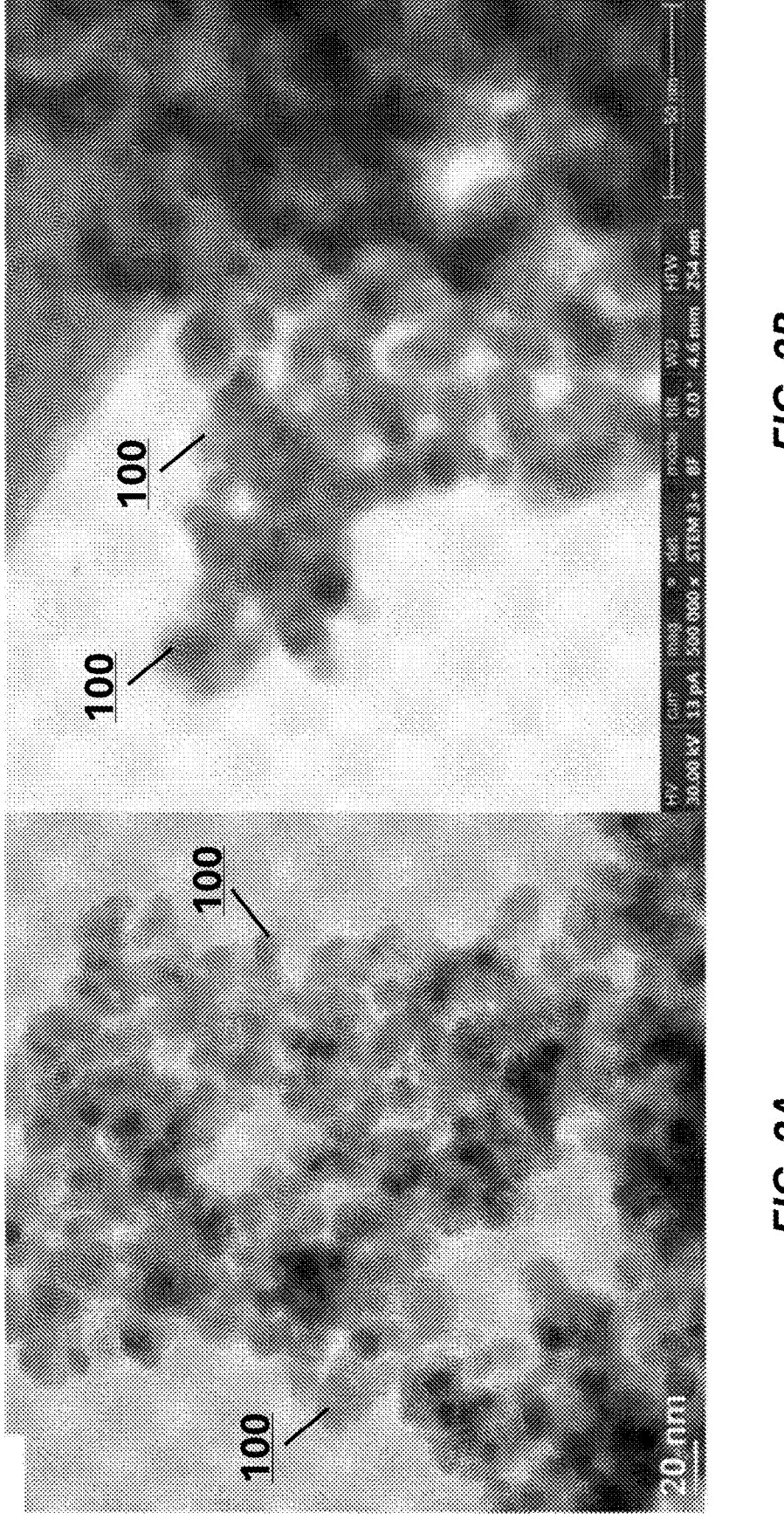
FIGS. 2A and 2B are electron micrographs showing individual silica-coated $Fe_3O_4$ nanoparticles and typical cluster size formed by the particles in aqueous dispersions.
Figure 2C:
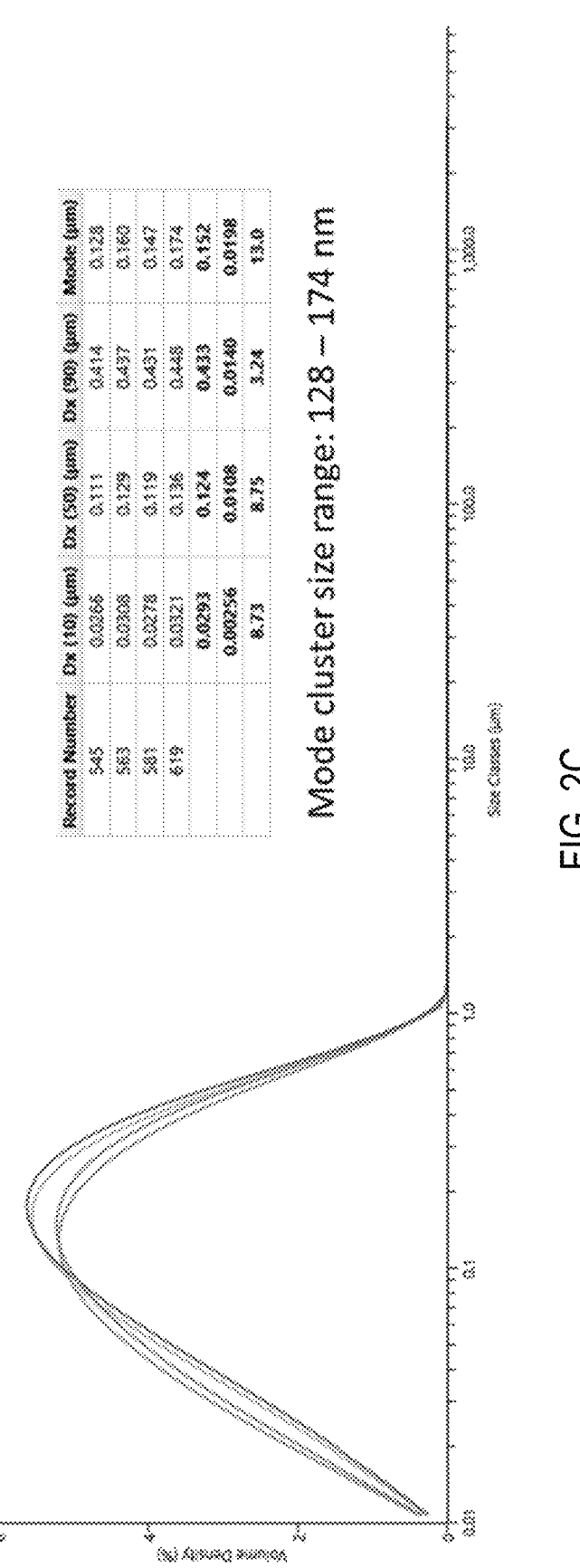
FIG. 2C shows laser diffraction data for silica-coated magnetic nanoparticles according to the present technology.

The ratio of the core diameter to the thickness of the silica coating 20, in combination of the characteristics of the silica coating 20 allows the magnetic nanoparticles 100 to aggregate and create a cluster as shown in FIGS. 2A and 2B. In an example, the clusters can be from about 10 nm to about 1000 nm, such as from about 20 nm to about 500 nm, from about 30 nm to about 400 nn, from about 40 nm to about 300 nm, or from about 50 nm to about 190 nm. FIG. 2C shows laser diffraction data measured with a Mastersizer 3000 from Malvern Panalytical, showing the distribution of particle sizes in a typical aqueous dispersion of silica-coated $Fe_3O_4$ nanoparticles. Individual particles up to clusters approximately 1 micron in diameter are present in the dispersion with the average cluster size being 128-174 nm in diameter.

The present nanoparticles show high magnetic susceptibility in manual and automated workflows. This is particularly desirable in automated platforms where the timing and efficiency of magnetic particle capture is important, requiring rapid and quantitative particle collection at capture, wash, and elution steps.

In some embodiments, the core of the nanoparticle is mostly or entirely composed of a crystalline lattice of $Fe_3O_4$. In some embodiments, the core of the nanoparticle is mostly or entirely composed of a single nanoscale crystal of magnetite ($Fe_3O_4$) or single domain magnetic nanoparticle of $Fe_3O_4$ that displays paramagnetism.

In some examples, the magnetic nanoparticle has a Brunauer-Emmett-Teller (BET) surface area of at least 105 $m^2/g$, such as at least from about 110 to about 180 $m^2/g$ or at least from about 110 $m^2/g$ to about 130 $m^2/g$. The BET surface area of the nanoparticle can be determined by the nitrogen adsorption technique. For example, nitrogen adsorption/desorption isotherms can be measured at liquid nitrogen temperature ($-196°$ C.) using a Micromeritics ASAP2020 volumetric adsorption analyzer for mesoporosity determination.

The silica-coated magnetic nanoparticles described herein can be used directly or functionalized to suit specific application needs. Functional groups such as carboxylate, epoxide, and tosylate can be included in or added to the silica coating, and such functional groups can be a convenient method for covalent functionalization. As further examples, the silica coating can also be modified by incorporating one or more types of organic groups into the silica matrix. Organic groups can covalently functionalize the surface and/or the pores of the silica coating. As another example, polymers can also functionalize the silica surface either by a simple coating or covalently attached.

The coatings of the silica magnetic nanoparticles described herein can include pores that extend to the surface of the magnetic nanoparticle. The coating can be modified with functional groups both inside and outside its pores. In some examples, the coating further comprises a reactive chemical moiety configured to bind an analyte, such as a nucleic acid.

Compositions Comprising Magnetic Nanoparticles

The present technology provides compositions that can include a plurality of the magnetic nanoparticles described herein. The plurality of magnetic nanoparticles have a mean particle size of about 15 nm or less, or about 12 nm or less, or about 11 nm or less. The composition is a stable suspension of the magnetic nanoparticles in a liquid medium, such as water. In some examples, the magnetic nanoparticles are present in the stable suspension at a concentration of from 3 to 30 g/L, or from 10 to 20 g/L, or about 13 g/L.

In some examples, the nanoparticles remain suspended for at least 6 months at a temperature of 25° C., alternatively for at least 9 months.

The present technology also includes packaged stable suspensions of magnetic nanoparticles. The magnetic particles or compositions described herein can be provided in a sealed package, wherein the interior volume of the sealed package is a suspension of nanoparticles in water.

Methods of Making Magnetic Nanoparticles

The present technology provides a method of making silica-coated magnetic nanoparticles. The present method for producing silica-coated magnetic nanoparticles includes synthesizing magnetic iron oxides from aqueous $Fe^{3+}/Fe^{2+}$ salt solutions through the addition of a base (such as ammonia or NaOH) under an inert atmosphere at room temperature. $Fe_3O_4$ particles may be made using coprecipitation. The size, shape, and composition of the magnetic nanoparticles depends on the type of salts used (e.g. chlorides, sulfates, nitrates), the $Fe^{3+}/Fe^{2+}$ ratio, the reaction temperature, and pH value. Once the synthetic conditions are fixed, the final characteristics of the magnetite nanoparticles synthesized become fully reproducible. The advantages of this technique in forming $Fe_3O_4$ nanoparticles include rapid formation of particles, use of inexpensive solvents, magnetic separation for isolation of product, controlled particle size and morphology, reproducible magnetic properties, and the ability to perform synthesis of nanoparticles on larger industrial scales.

The methods include preparing an aqueous solution of $Fe^{3+}$ and $Fe^{2+}$ ions in deionized, de-oxygenated water in a $Fe^{3+}/Fe^{2+}$ molar ratio of about 2/1. In some examples, the concentration of $Fe^{3+}$ in the aqueous solution is from about 2 to about 50 mmol, and the concentration of $Fe^{2+}$ in the aqueous solution is from about 1 to about 25 mmol. The aqueous solution can be prepared by dissolving $FeCl_3$ and $FeCl_2$ in deionized, de-oxygenated water, though other iron salts may be used as well. The water can be de-oxygenated by any suitable technique, such as by sparging with an inert gas, sonicating, and/or stirring, for a sufficient de-oxygenating period before combining the water with iron salts. The de-oxygenating period will generally be at least two hours, though longer or shorter periods may be employed.

The aqueous solution of $Fe^{3+}$ and $Fe^{2+}$ ions may then be sonicated, and optionally its temperature may be adjusted to about 35° C., such as by heating the aqueous solution from room temperature. A base may be added to the heated aqueous solution under an inert atmosphere. In some examples, suitable bases include ammonia, sodium hydroxide, and others. The base is added in an amount sufficient for formation of $Fe_3O_4$ cores from the aqueous solution. For example, the base may be added at a 2-fold or greater (e.g., 4-fold or 8-fold) molar excess. As a result of adding a sufficient quantity of base, a mixture is formed which includes $Fe_3O_4$ nanoparticles and alkaline water.

The mixture is maintained under an inert atmosphere without stirring for a settling period, during which the $Fe_3O_4$ nanoparticles settle out of the alkaline water. In some examples, the settling period is overnight, or about 12 hours; in other examples, the settling period is at least 4, 6, 8, 12, or 18 hours, and/or no more than 60 hours, 48 hours, 36 hours, 24 hours or 20 hours; the foregoing values can be combined to form a settling period range. After the settling period, most of the alkaline water is removing from the mixture via aspiration. This provides a concentrated mixture of $Fe_3O_4$ nanoparticles in alkaline water.

A de-oxygenated alcohol is added to the concentrated mixture to form an aqueous alcohol mixture. The aqueous alcohol mixture is stirred and sonicated to suspend the $Fe_3O_4$ nanoparticles. In some examples, additional base is added to the aqueous alcohol mixture before further processing.

While sonicating and maintaining an inert atmosphere, a silicate solution is added to the aqueous alcohol mixture. The silica coating thickness can be controlled by the amount of the reactants used. The silicate solution may be added dropwise to the aqueous alcohol mixture while stirring and sonicating the mixture. The silicate solution includes tetraethyl orthosilicate (TEOS) and an alcohol. In some examples, the silicate solution is anhydrous.

This mixture is stirred for a coating period under the inert atmosphere, during which a silica coating forms on the $Fe_3O_4$ nanoparticles. In some examples, the coating period is overnight, or about 12 hours; in other embodiments, the coating period is at least 4, 6, 8, 12, or 18 hours, and/or no more than 60 hours, 48 hours, 36 hours, 24 hours or 20 hours; the foregoing values can be combined to form a coating period range.

The silica-coated $Fe_3O_4$ nanoparticles are separated from the alcohol aqueous mixture by any suitable separation technique. In some examples, the $Fe_3O_4$ nanoparticles are separated by magnetic capture from the aqueous alcohol mixture. The silica-coated $Fe_3O_4$ nanoparticles can be washed with methanol or other alcohol or solvent. The separated silica-coated $Fe_3O_4$ nanoparticles can be dried, such as through vacuum drying. A powder of the silica-coated $Fe_3O_4$ nanoparticles is formed by drying. In some examples, the powder comprising silica-coated $Fe_3O_4$ nanoparticles is formed without milling or mechanically separating the nanoparticles.

The powder may be dispersed into de-oxygenated water to form a composition. In some examples, the composition is a stable suspension.

Methods of Separating Nucleic Acids from Samples with Magnetic Nanoparticles

The present technology also includes methods for preparing nucleic acids for analysis, by separating the nucleic acids from a sample. In some examples, the methods comprise the steps of combining a sample comprising nucleic acids with a binding medium and a magnetic nanoparticle composition as described herein in a vessel. The nucleic acids bind to the coating of the magnetic nanoparticles. After a binding period, the nucleic acid-bound magnetic nanoparticles are separated from the binding medium within the vessel. The nucleic acid-bound magnetic nanoparticles are contacted with a washing solution to remove unwanted contaminants and then contacted with an elution medium, thereby separating the bound nucleic acids from the magnetic nanoparticles. The magnetic nanoparticles are drawn by a magnet and the resulting clarified solution containing the desired nucleic acids are removed from the vessel, thereby providing a nucleic acid preparation.

The magnetic nanoparticles and compositions described herein have many uses, such as for separation of analytes such as small molecules, protein, and/or nucleic acids from biological samples. The magnetic nanoparticles and compositions may be used as carriers for chemical or biological species, including, for example, noble metal particles, small organic or inorganic molecules, DNA, peptides or polypeptides (e.g. antibodies and other proteins), and whole cells. Applications for such carriers may include magnetic resonance imaging (MRI), optical imaging, targeted drug delivery, and cell delivery.

The present technology provides a method for preparing nucleic acids for analysis. The method comprises the steps of combining a sample comprising nucleic acids with a binding medium and a magnetic nanoparticle composition as described herein in a vessel. The nucleic acids bind to the coating of the magnetic nanoparticles. After a binding period, the nucleic acid-bound magnetic nanoparticles are separated from the binding medium within the vessel. In some examples, the nucleic acid-bound magnetic nanoparticles are then washed with a washing medium comprising aqueous alcohol or a variety of water miscible organic solvents, for example acetonitrile, acetone and sulfolane. Most of the liquid (binding medium and/or washing medium) is then removed from the vessel while taking care to retain the nucleic acid-bound magnetic nanoparticles within the vessel. The nucleic acid-bound magnetic nanoparticles are contacted with an elution medium, thereby separating the bound nucleic acids from the magnetic nanoparticles. The nucleic acids are removed from the vessel, thereby providing a nucleic acid preparation.

The coating of the magnetic nanoparticles may comprise a binding moiety configured to selectively bind nucleic acid or another analyte.

The separation of nucleic acids from a sample is illustrative of separating other analytes, such as small molecules such as pharmaceutical agents, proteins or polypeptides, lipids, or other analytes.

The present method may be employed to normalize the amount of nucleic acids obtained from a sample. In such methods, the sample includes an input amount of nucleic acids, and the magnetic nanoparticle composition has a binding capacity for an output amount of nucleic acids. The output amount is less than the input amount.

The magnetic nanoparticle composition may have a normalization factor between 0.8 and 1.2, wherein the normalization factor refers to the concentration value of nucleic acids recovered from magnetic silica nanoparticles after exposure to a high concentration of nucleic acids divided by the concentration value of nucleic acids recovered from magnetic silica nanoparticles after exposure to a low concentration of nucleic acids. Ideally for compositions prepared for NGS, the normalization factor will be about 1.0.

The nucleic acid preparation includes nucleic acids having lengths within a predetermined length range. In some examples, the minimum nucleotide length is 50 nucleotides (nt), or 70 nt, or 75 nt, or 80 nt, or 100 nt, or 150 nt, or 200 nt, or 500 nt, or 2,000 nt, or 5,000 nt, or 10,000 nt, or 50,000 nt, or 100,000 nt; the maximum nucleotide may be 2 million nt, or 1 million nt, or 500,000 nt, or 200,000 nt, or 75,000 nt, or 25,000 nt, or 12,500 nt, or 6,000 nt, or 3,000 nt, or 1,500 nt, or 750 nt, or 400 nt, or 250 nt; any of the foregoing minimum and maximum may be combined to form a desired nucleotide length range, so long as the minimum is smaller than the maximum.

The present method may be employed with the input sample includes a low amount of nucleic acid, for example, less than 1,000 ng, or less than 500 ng, or less than 200 ng, or less than 100 g, or less than 50 ng of nucleic acid.

The present technology provides a method of obtaining RNA from a biological sample and preparing the RNA for analysis. In the method, a biological sample comprising RNA is placed in a vessel. The biological sample may be a cell or a virus.

The method includes contacting the biological sample with guanidine thiocyanate (GTC) and Proteinase K to form a sample mixture, which is incubated at an elevated temperature (such as about 60° C.) for a sample preparation period (such as 10 minutes or less, or about 5 minutes). The GTC and Proteinase K may be added separately or premixed and added together. After the sample preparation period, neat alcohol is added to the sample mixture in the vessel, and one of the magnetic nanoparticle compositions described herein is also added to the sample mixture in the vessel. The sample mixture and the magnetic nanoparticles are mixed and incubated for a second incubation period (such as 10 minutes or less, or about 5 minutes).

After the second incubation period, a magnetic force is applied to separate the magnetic nanoparticles from a supernatant within the vessel. The supernatant is removed from the vessel without disturbing the separating magnetic nanoparticles, which are then washed one or more times with an alcohol solution. Suitable alcohol solutions may comprise 80% v/v or greater of a lower alcohol such as methanol, ethanol, n-propanonl, iso-propanol, or a mixture thereof. A substantial variety of non-alcohol organic solvents that are miscible with water are also useful for the washing purpose and are known to those skilled in the art. Several of these include, but are not limited to acetonitrile, acetone and sulfolane. The separated magnetic nanoparticles are dried, and an elution medium is added to the vessel. The magnetic nanoparticles are mixed with the elution medium for an elution period (e.g., less than 10 minutes), after which RNA is eluted from the magnetic nanoparticles to form an eluate. The eluate containing RNA is removed from the vessel, and the RNA may then be subjected to analysis such as quantitative reverse transcription polymerase chain reaction (QRT-PCR) for diagnostic and research purposes or can be modified to serve as a substrate for nucleotide sequencing such as Sanger and Next Generation [NGS] sequencing. Alternatively, the removed eluate may be placed in a second vessel which is sealed and stored at a reduced temperature, such as for shipping or later analysis.

In some examples, one, several or all steps of the foregoing methods are performed by an automated instrument.

Terminology

It is to be understood that the terminology used herein is for purposes of describing particular embodiments only and is not intended to be limiting. The defined terms are in addition to the technical and scientific meanings of the defined terms as commonly understood and accepted in the technical field of the present teachings.

The term "nucleic acid" and "polynucleotide" are used interchangeably herein to describe a polymer of any length, e.g., greater than about 10 bases, greater than about 100 bases, greater than about 500 bases, greater than 1000 bases, greater than 10,000 or more bases, composed of nucleotides, e.g., deoxyribonucleotides or ribonucleotides, or compounds produced synthetically which may hybridize with naturally occurring nucleic acids in a sequence specific manner analogous to that of two naturally occurring nucleic acids, e.g., can participate in Watson-Crick base pairing interactions. Naturally occurring nucleotides include guanine, cytosine, adenine, thymine and uracil (G, C, A, T, and U respectively).

The term "complementary," "complement," or "complementary nucleic acid sequence" refers to the nucleic acid strand that is related to the base sequence in another nucleic acid strand by the Watson-Crick base-pairing rules. In general, two sequences are complementary when the sequence of one can hybridize to the sequence of the other in an anti-parallel sense wherein the 3-end of each sequence hybridizes to the 5'-end of the other sequence and each A, T/U, G, and C of one sequence is then aligned with a T/U, A, C, and G, respectively, of the other sequence.

The term "duplex" means at least two sequences that are fully or partially complementary undergo Watson-Crick type base pairing among all or most of their nucleotides so that a stable complex is formed. The terms "annealing" and "hybridization" are used interchangeably to mean the formation of a stable duplex.

The terms "hybridization", and "hybridizing", in the context of nucleotide sequences are used interchangeably herein. The ability of two nucleotide sequences to hybridize with each other is based on the degree of complementarity of the two nucleotide sequences, which in turn is based on the fraction of matched complementary nucleotide pairs. The more nucleotides in a given sequence that are complementary to another sequence, the more stringent the conditions can be for hybridization and the more specific will be the hybridization of the two sequences. Increased stringency can be achieved by elevating the temperature, increasing the ratio of co-solvents, lowering the salt concentration, and the like.

As used in the specification and appended claims, and in addition to their ordinary meanings, the terms "substantial" or "substantially" mean to within acceptable limits or degree to one having ordinary skill in the art. For example, "substantially cancelled" means that one skilled in the art considers the cancellation to be acceptable.

As used in the specification and the appended claims and in addition to its ordinary meaning, the terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same.

In the present disclosure, numeric ranges are inclusive of the numbers defining the range. It should be recognized that chemical structures and formula may be elongated or enlarged for illustrative purposes.

Unless defined otherwise, all technical and scientific terms used herein have the same meaning as commonly understood by those working in the fields to which this disclosure pertain.

Before the various embodiments are described, it is to be understood that the teachings of this disclosure are not limited to the particular embodiments described, and as such can, of course, vary. It is also to be understood that the terminology used herein is for the purpose of describing particular embodiments only and is not intended to be limiting since the scope of the present teachings will be limited only by the appended claims.

As disclosed herein, a number of ranges of values are provided. It is understood that each intervening value, to the tenth of the unit of the lower limit, unless the context clearly dictates otherwise, between the upper and lower limits of that range is also specifically disclosed.

Unless defined otherwise, all technical and scientific terms used herein have the same meaning as commonly understood by one of ordinary skill in the art to which this disclosure belongs. Although any methods and materials similar or equivalent to those described herein may also be used in the practice or testing of the present teachings, some exemplary methods and materials are now described.

All patents and publications referred to herein are expressly incorporated by reference.

As used in the specification and appended claims, the terms "a," "an," and "the" include both singular and plural referents, unless the context clearly dictates otherwise. Thus, for example, "a moiety" includes one moiety and plural moieties.

EXAMPLES

Example 1

In this example, silica-coated magnetic nanoparticles (NP) are made using the method described previously and below. An exemplary procedure to synthesize $Fe_3O_4$ nanoparticles on the 1 g scale was performed as follows: 400 ml of DI water was extensively de-oxygenated using hard $N_2$ purging, mechanical stirring, and sonication for 2 hrs. Once de-oxygenated, 2.508 g of $FeCl_3$ (9.24 mmol) and 0.919 g $FeCl_2$ (4.62 mmol) were added under nitrogen and additionally purged/sonicated. Over the course of the sonication, the temperature of the water increased to 35° C. Afterwards, 10 ml of 28% ammonia solution was quickly added (0.18 mol, which is approximately a 4 molar excess) to the rapidly stirring and sonicating solution. The solution became instantly black with nanoparticle precipitate. Sonication was stopped and the mixture was stirred under nitrogen for another 4 hours. Afterwards, the particles were left to sit under nitrogen until the next day without stirring. The nanoparticles settled to the bottom of the flask yielding a clear upper aqueous layer and a black bottom layer consisting of the magnetic $Fe_3O_4$ nanoparticles.

On the next day the settled $Fe_3O_4$ nanoparticles were isolated by removing via aspiration a clear upper layer of ammonia/water. The remaining solvent (100 ml) was left in place. Three-hundred ml of de-oxygenated ethanol was then added to the black slurry. The particles were stirred and sonicated for 1 hr. to resuspend the nanoparticles. While sonicating, 1.5 ml of TEOS was mixed with 80 ml of anhydrous ethanol and placed in an addition funnel under a nitrogen purge and fitted to the flask. The flask was purged, then sealed under flowing $N_2$. To the black NP suspension was then added 5 ml of additional ammonia solution (28%). The mixture was again sonicated and mechanically stirred for 10 minutes under a nitrogen flow. The TEOS solution was then added dropwise over the period of about 60 min. to the stirring and sonicating nanoparticles. After addition of the TEOS solution, the stirring was continued slowly overnight under $N_2$.

On the next day, a magnet was used to isolate the nanoparticles to the bottom of the flask. The clear ethanol/water mixture was decanted off the NPs which were held in place by the magnet. The silica-coated $Fe_3O_4$ nanoparticles were washed with fresh methanol twice and magnetically separated. The nanoparticles were then dried under a stream of nitrogen to a powder, then dispersed into 100 ml of de-oxygenated water. The NPs were sparged extensively with nitrogen and sonicated before sealing under inert atmosphere yielding a 1.3 wt. % solution of nanoparticles in water.

Samples of the silica-coated $Fe_3O_4$ nanoparticles were isolated as the dry particles in order to perform various analyses. Scanning electron microscopy (SEM) was used to image the particles to approximate the degree of aggregation and overall size of the individual particles. FIGS. 2A to 2B are scanning electron microscopy (SEM) images of silica-coated magnetic nanoparticle according to the present technology. FIG. 2C shows laser diffraction data for silica-coated magnetic nanoparticles according to the present technology.

Use of the current technique, which includes sonication during the synthesis, aids in reducing the size of the nanoparticles and prevents aggregation of the particles. Estimates by SEM show the final silica-coated $Fe_3O_4$ nanoparticles are between 10 and 15 nm in diameter. This suggests the core/coating structure is composed of an internal $Fe_3O_4$ nanoparticle which is approximately 7-10 nm in diameter which incorporates an external shell of silica approximately 1.5 nm in thickness. These sizes have been confirmed using high resolution TEM.

Figure 2D:
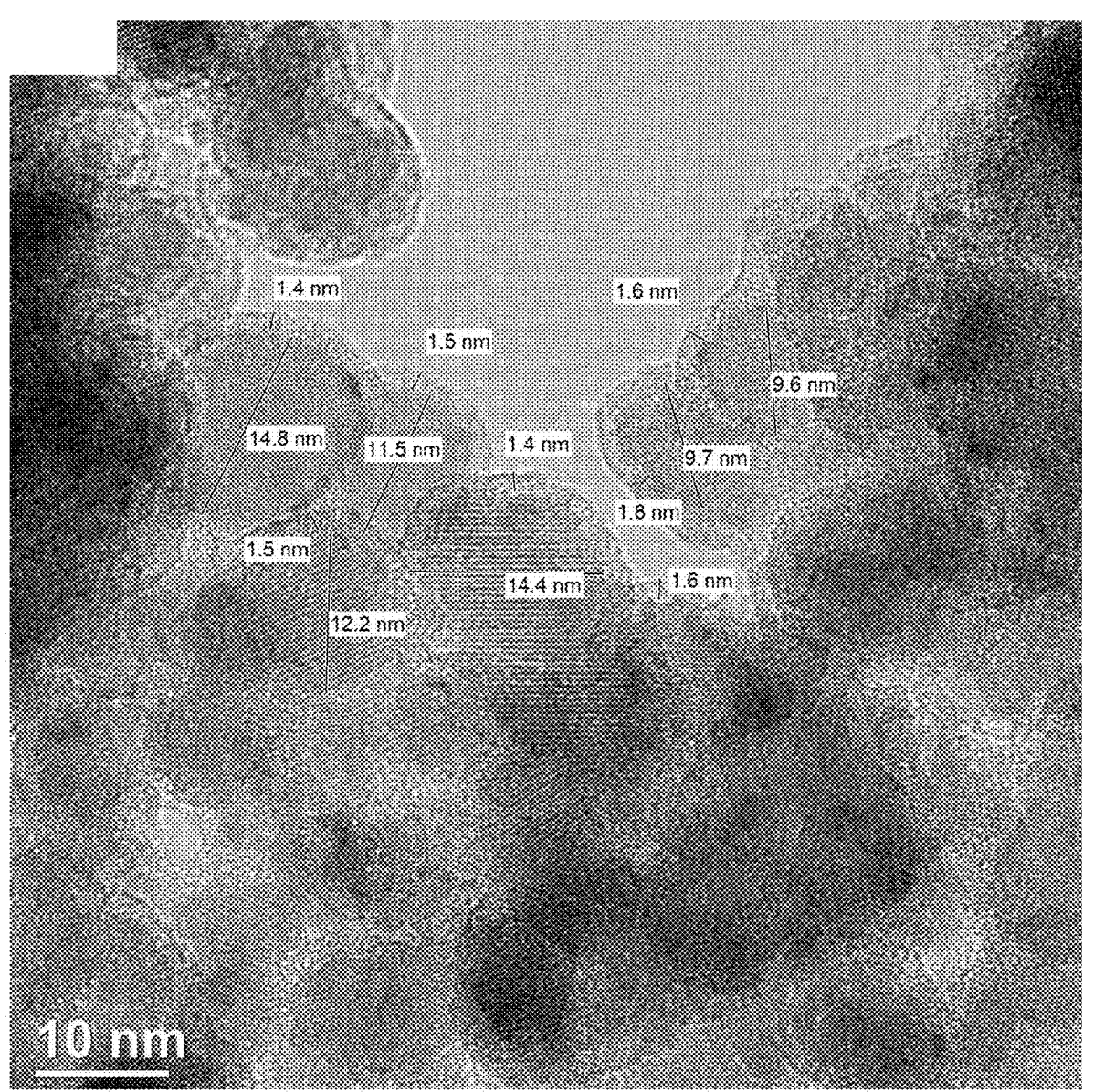
FIGS. 2D to 2I are TEM images for silica-coated magnetic nanoparticles prepared in Example 1.
Figure 2E:
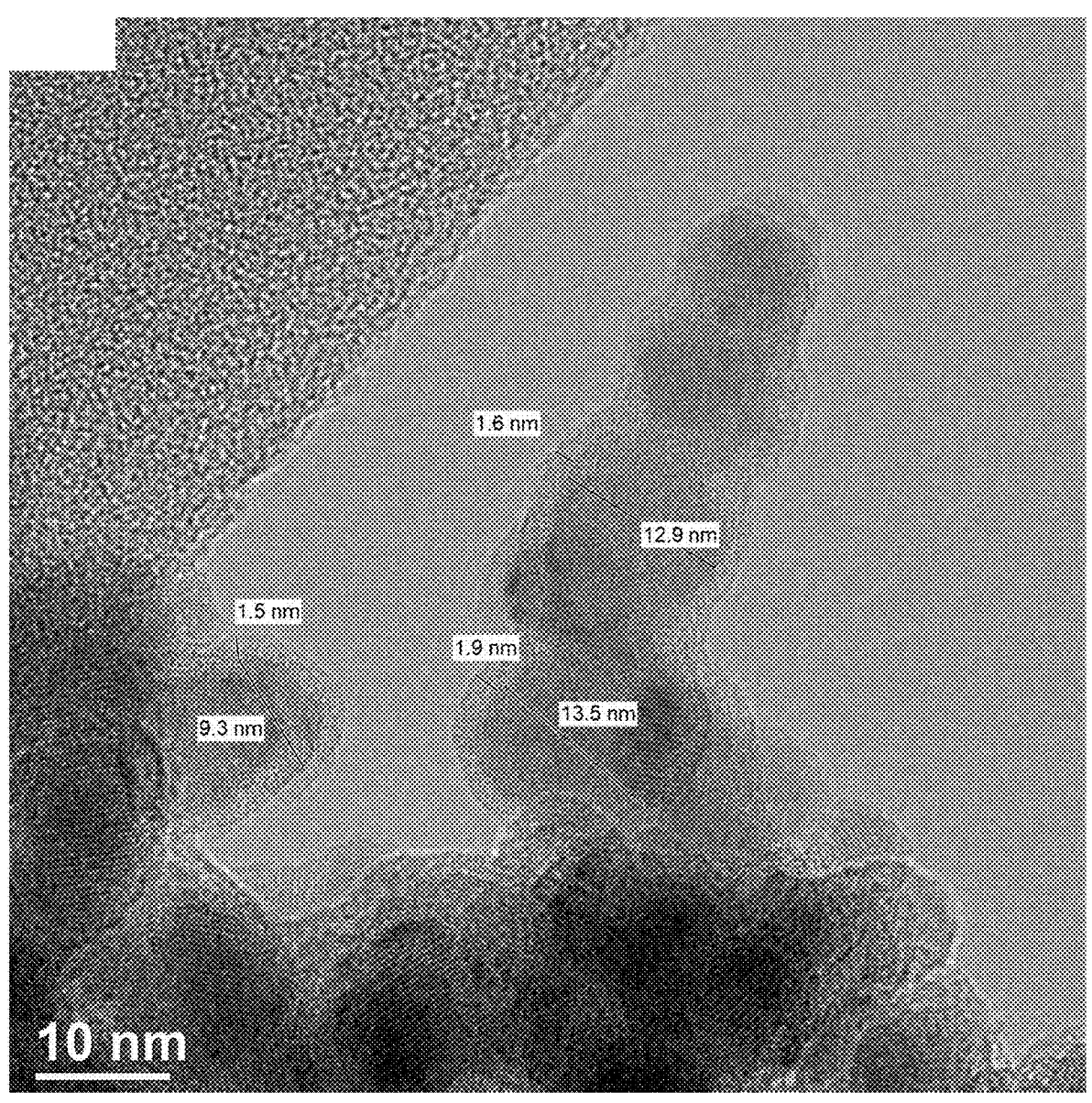
Figure 2F:
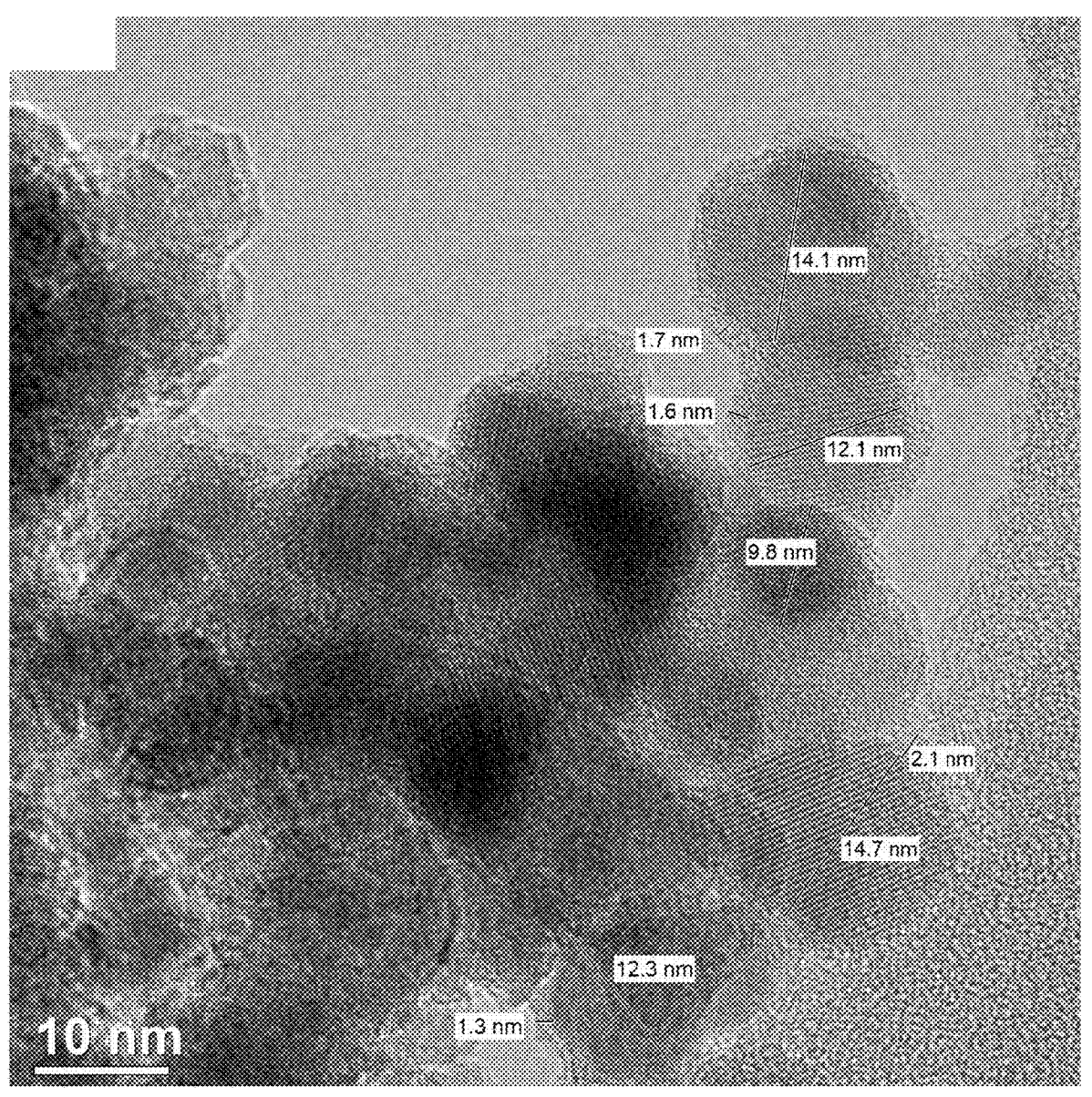
Figure 2G:
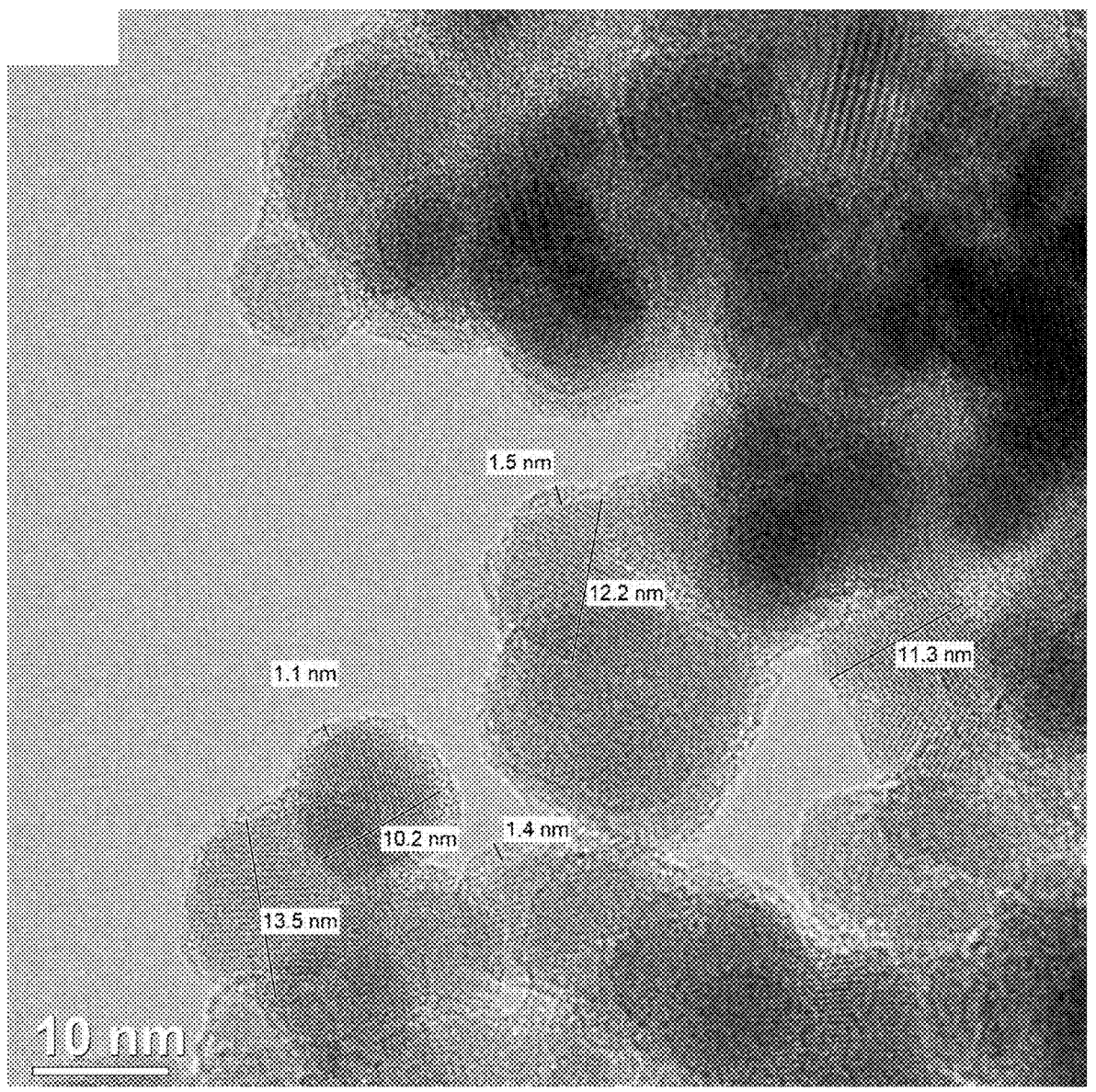
Figure 2H:
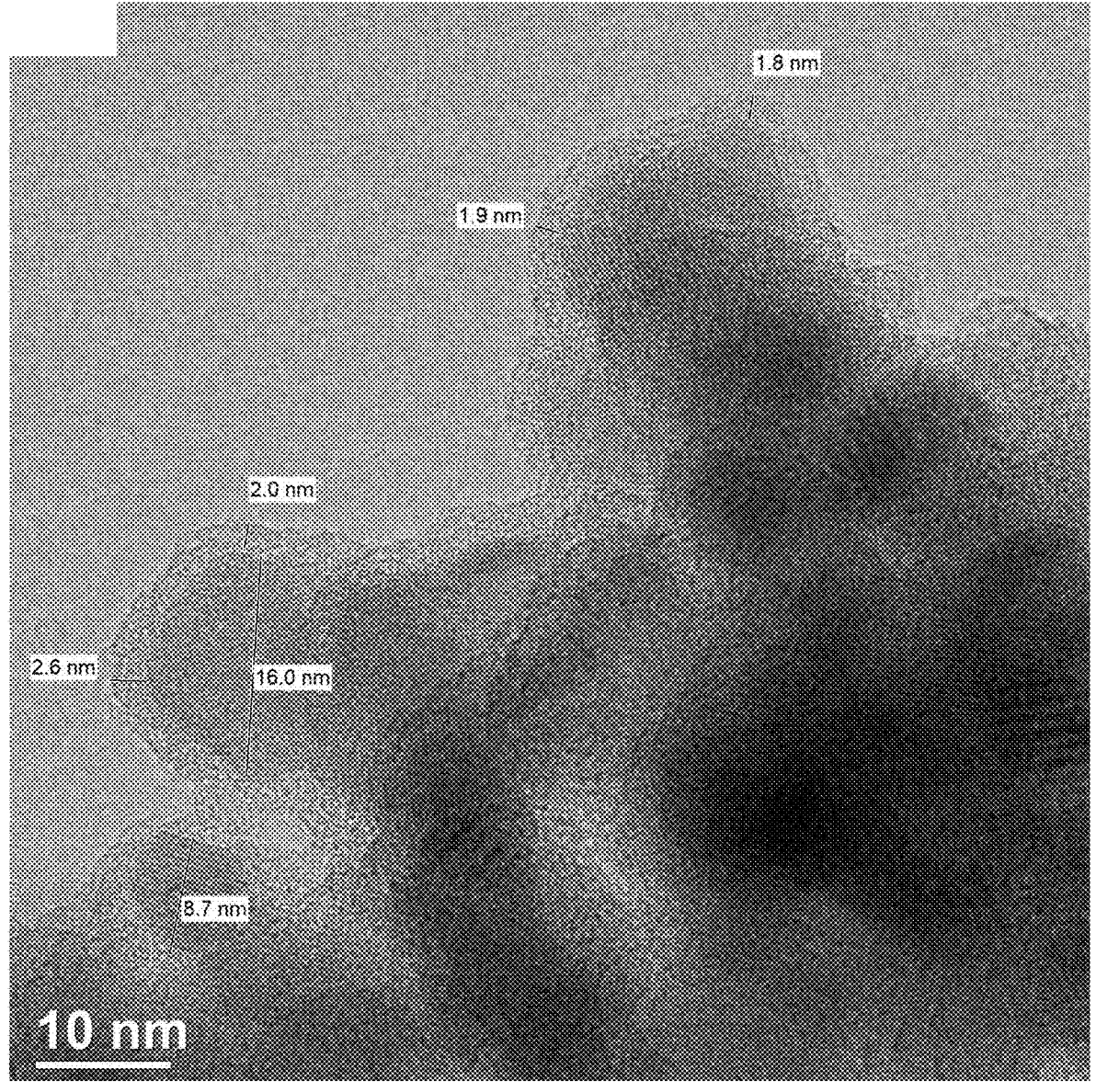
Figure 2I:
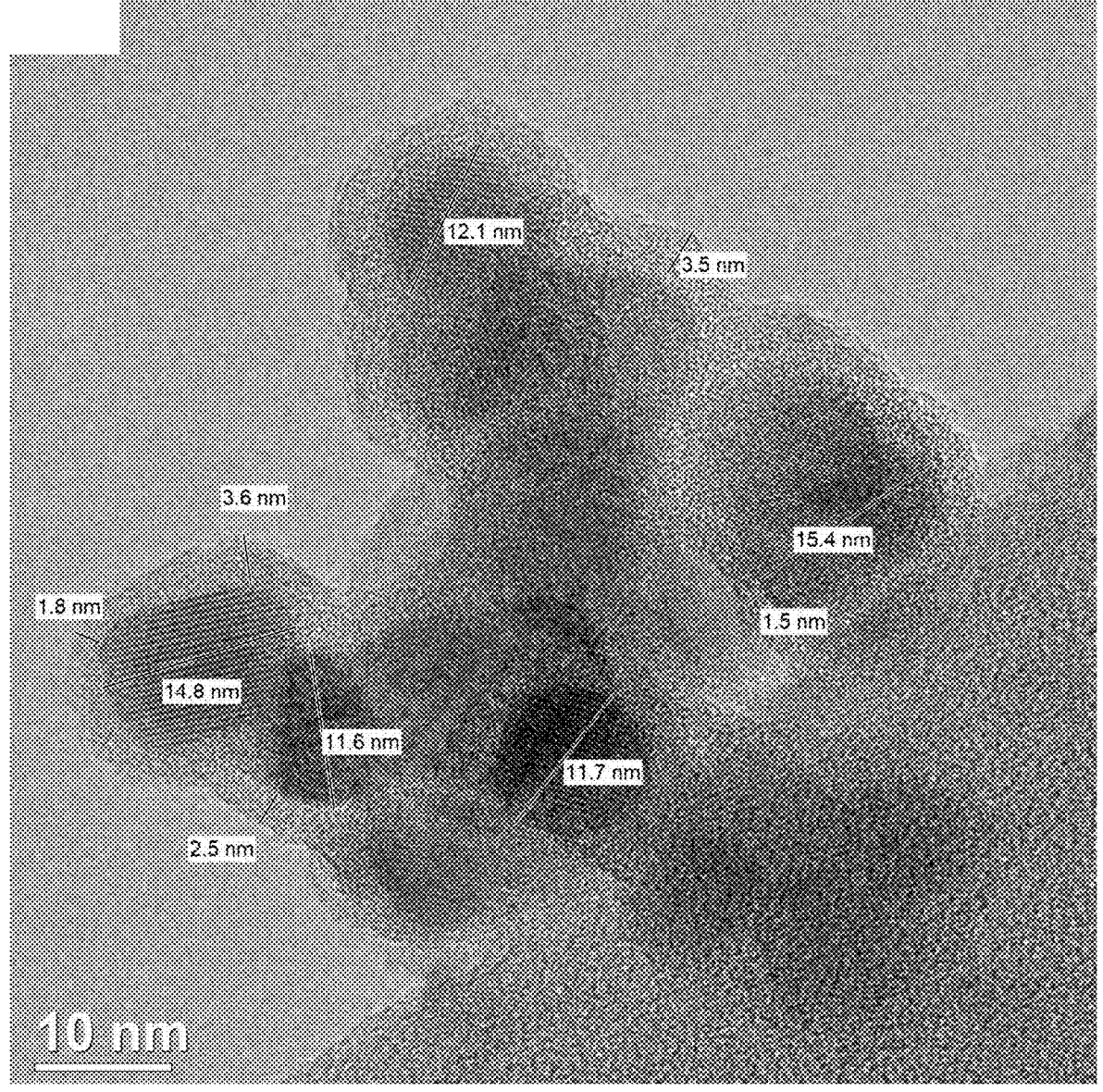

Examples 1-1, 1-2, and 1-3 were prepared using the technique described above, with differing amounts of the TEOS solution. The silica-coated $Fe_3O_4$ nanoparticles were analyzed by IR and TEM, and they were found to have highly desirable size characteristics and SiO:FeO ratios. FIGS. 2D and 2E are TEM images for Example 1-1, FIGS. 2F and 2G are TEM images for Example 1-2, and FIGS. 2H and 2I are TEM images for Example 1-3. The following table provides the average shell thickness and average core particle size for each of these examples.

| Example # | TEOS ml (Eq. ml) | SiO:FeO | Coating thickness (nm) | Core particle size (nm) |
|---|---|---|---|---|
| 1-1 | 11.3 (1.5) | 3.4 | 1.5 ± 0.3 | 11.3 ± 3 |
| 1-2 | 7.5 (1.0) | 2.4 | 1.4 ± 0.3 | 10.6 ± 2.1 |
| 1-3 | 15.0 (2.0) | 4.3 | 2.3 ± 0.6 | 12.6 ± 3.1 |

In the foregoing table, the amount of TEOS used for the reaction is provided in volumes and in equivalents. The ratio of SiO to FeO in the resulting silica-coated nanoparticles was determined by IR analysis. The shell thickness and the core particle size were determined based on the TEM analysis.

Figure 3:
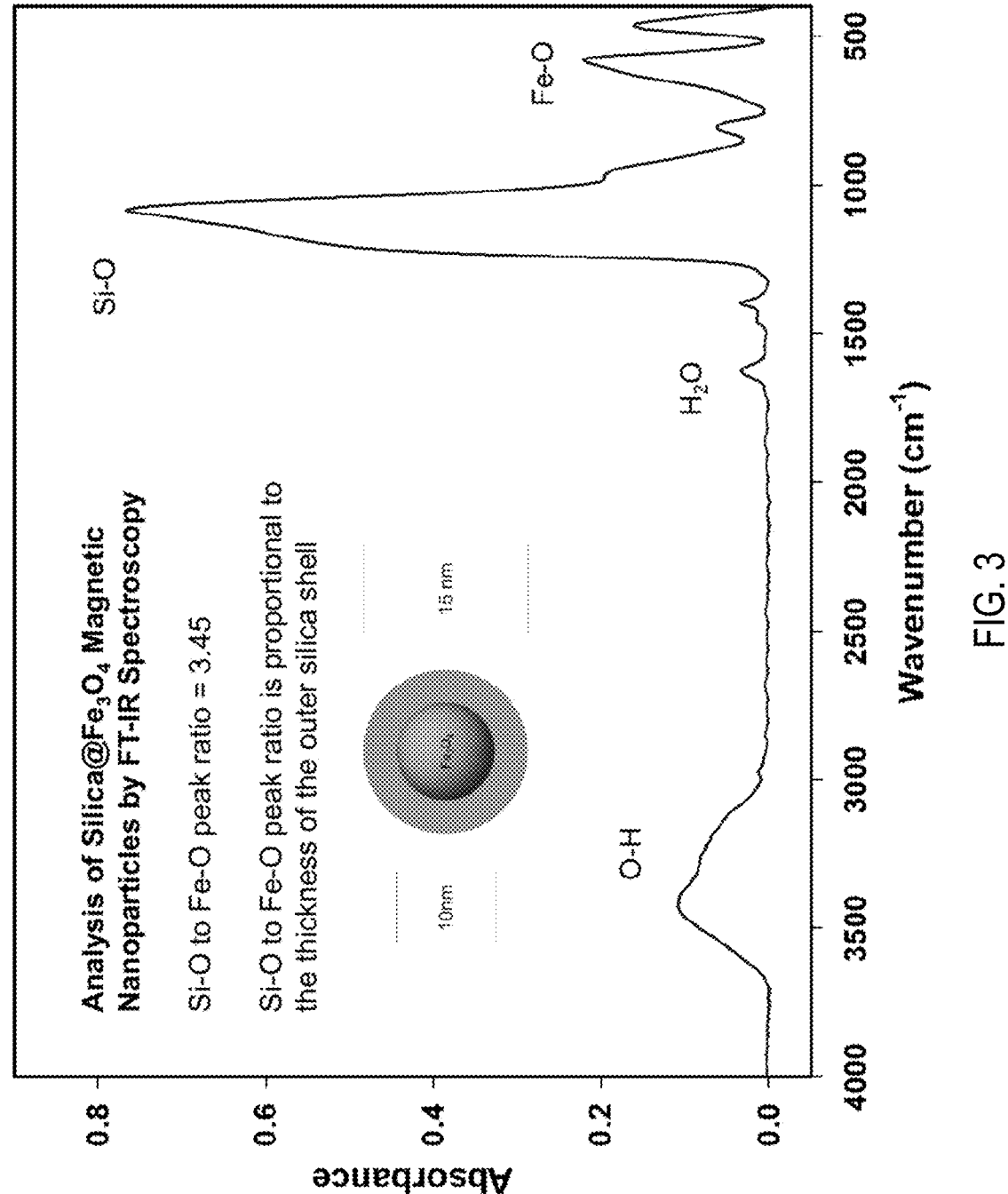
FIG. 3 is an analysis of an embodiment of the silica-coated magnetic nanoparticles by FT-IR spectroscopy. The analysis reveals a Si—O to Fe—O peak ratio of 3.45, and the Si—O to Fe—O peak ratio is proportional to the thickness of the outer silica coating.

Analysis of the dried silica-coated $Fe_3O_4$ nanoparticles using Brunauer-Emmett-Teller (BET) theory indicate the materials surface area exceeds 105 $m^2/g$, such as 113-127 m2/g, which matches well with the estimated diameter of the particles. Analysis of the nanoparticles was also performed using FT-IR spectroscopy before and after functionalization with the silica shell. FT-IR analysis of the non-coated $Fe_3O_4$ nanoparticles shows two overlapping bands at 580 cm$^{-1}$ and 630 cm$^{-1}$ which are associated with the metal-oxygen Fe—O stretching vibration in the crystalline lattice of the $Fe_3O_4$ magnetic phase. After coating the nanoparticles with silica, these bands are joined by additional modes at 3400 cm$^{-1}$, 1094 cm$^{-1}$, and 467 cm$^{-1}$ which arise from silica O—H stretching and Si—O stretching of the $SiO_2$ shell (See FIG. 3). The appearance of the new modes confirms encapsulation of the nanoparticles with a thin shell of silica.

Two other batches of silica-coated nanoparticles were prepared in the same manner as Example 1-1, and the coating thickness was assessed. As shown in the following table, the procedure resulted in silica-coated nanoparticles having extremely consistent coating thicknesses, with little batch-to-batch variability.

| Example # | $SiO_2$ Coating thickness (nm) |
|---|---|
| 1-1 | 1.5 |
| 1-1A | 1.54 |
| 1-1B | 1.56 |

Example 2

In this example, silica-coated nanoparticles were prepared following the procedure set forth in Example 1, except that different amounts of silicate were used in the procedure. The following table summarizes the five different embodiments of magnetic nanoparticles prepared in this Example.

| Example # | Fe(III)Cl$_3$ | Fe(II)Cl$_2$ | TEOS | SiO2@Fe3O4 | IR Ratio |
|---|---|---|---|---|---|
| 2-1 | 2.50 g | 0.93 g | 0.5 ml | 1.25 g | 1.09 |
| 2-2 | 2.50 g | 0.92 g | 1.0 ml | 1.33 g | 1.94 |
| 2-3 | 2.50 g | 0.94 g | 1.5 ml | 1.41 g | 2.84 |
| 2-4 | 2.51 g | 0.95 g | 2.0 ml | 1.63 g | 3.45 |
| 2-5 | 2.50 g | 0.96 g | 2.5 ml | 1.62 g | 4.23 |

Figure 4:
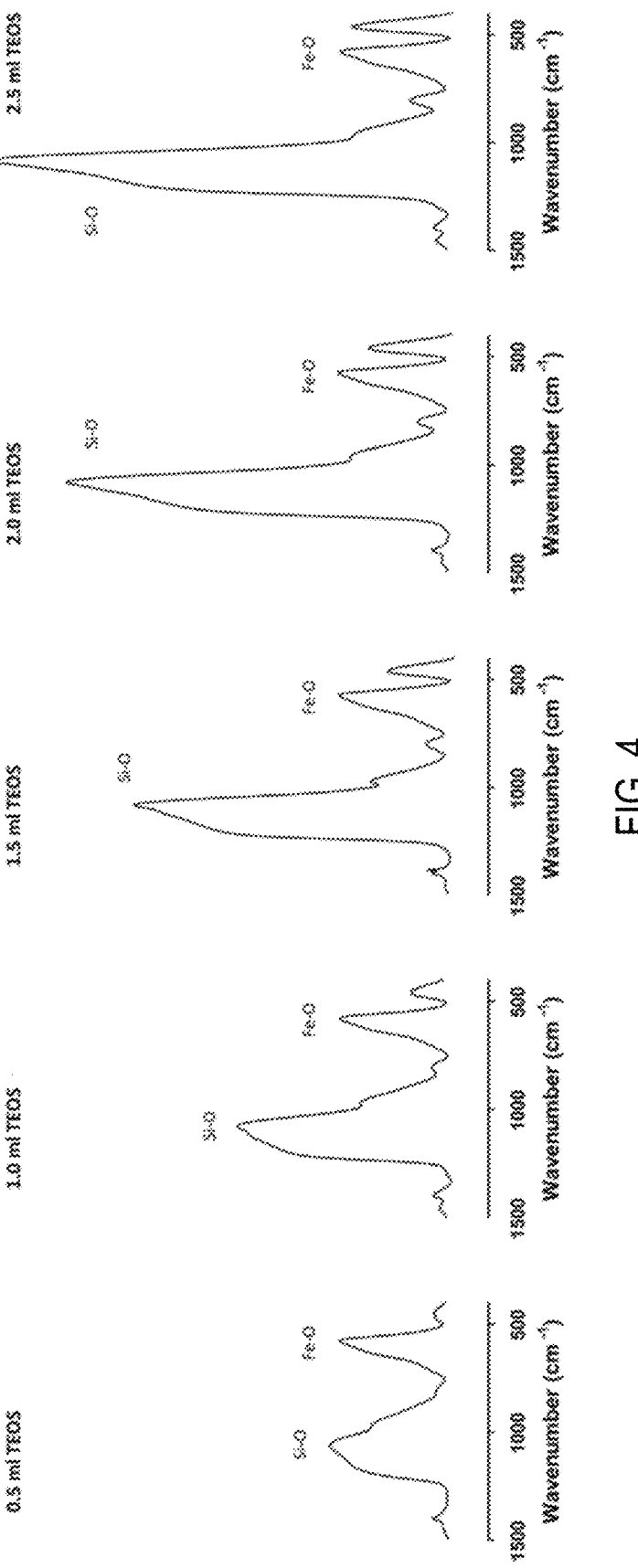
FIG. 4 is a series of IR spectra showing the increase of the Si—O to Fe—O peak ratio as an increasing volume of TEOS was used for the silica coating process (0.5 ml to 2.5 ml). The higher Si—O to Fe—O peak ratio signals the formation of thicker silica shells on the $Fe_3O_4$ nanoparticle core.

The silica-coated magnetic nanoparticles were analyzed by FT-IR, and FIG. 4 shows the spectra. The particles of the various embodiments have different thicknesses of their silica coatings. The IR analysis demonstrated that the thickness of the silica coating increases linearly with increasing TEOS amounts.

Figure 5:
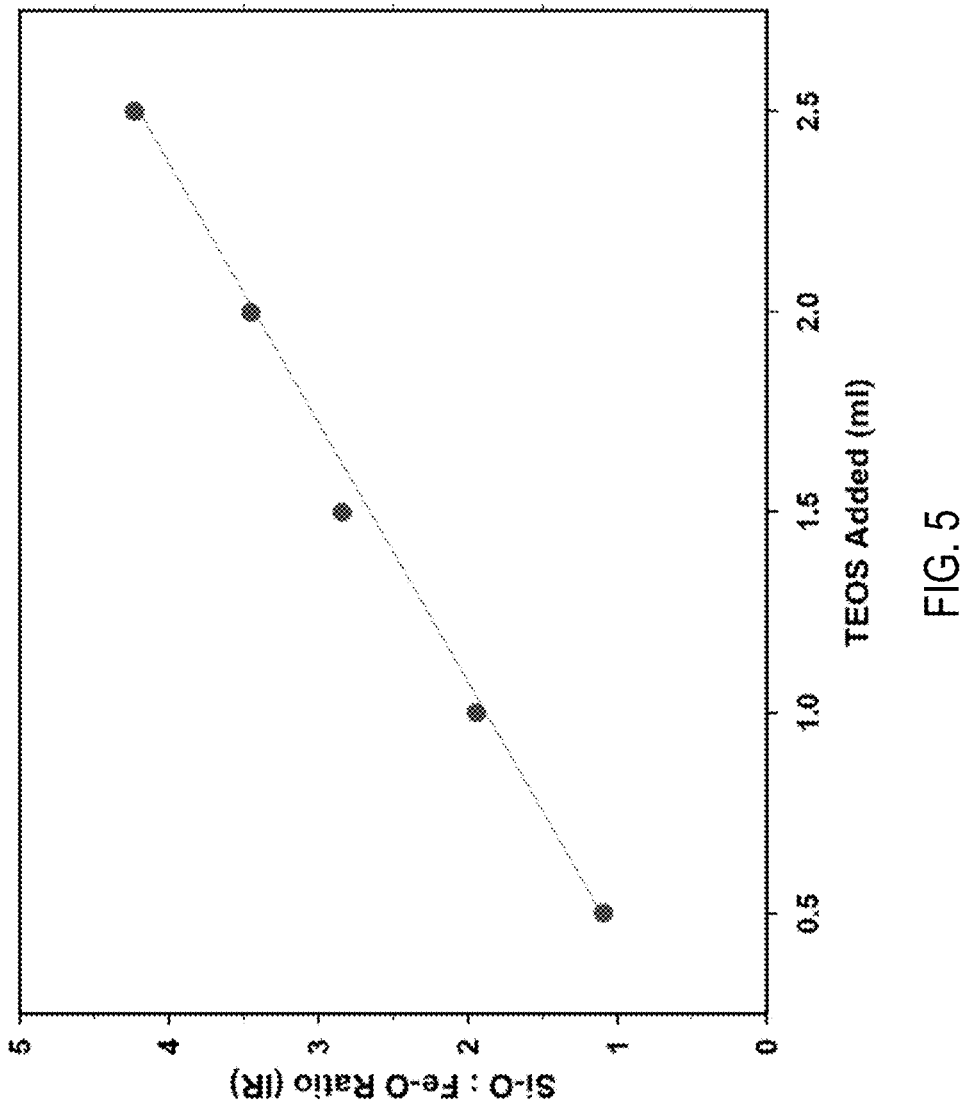
FIG. 5 is a graph illustrating that the thickness of the silica coating increases linearly with increasing TEOS amounts.

FIG. 5 is a graph illustrating that the thickness of the silica coating increases linearly with increasing TEOS amounts.

Figure 6:
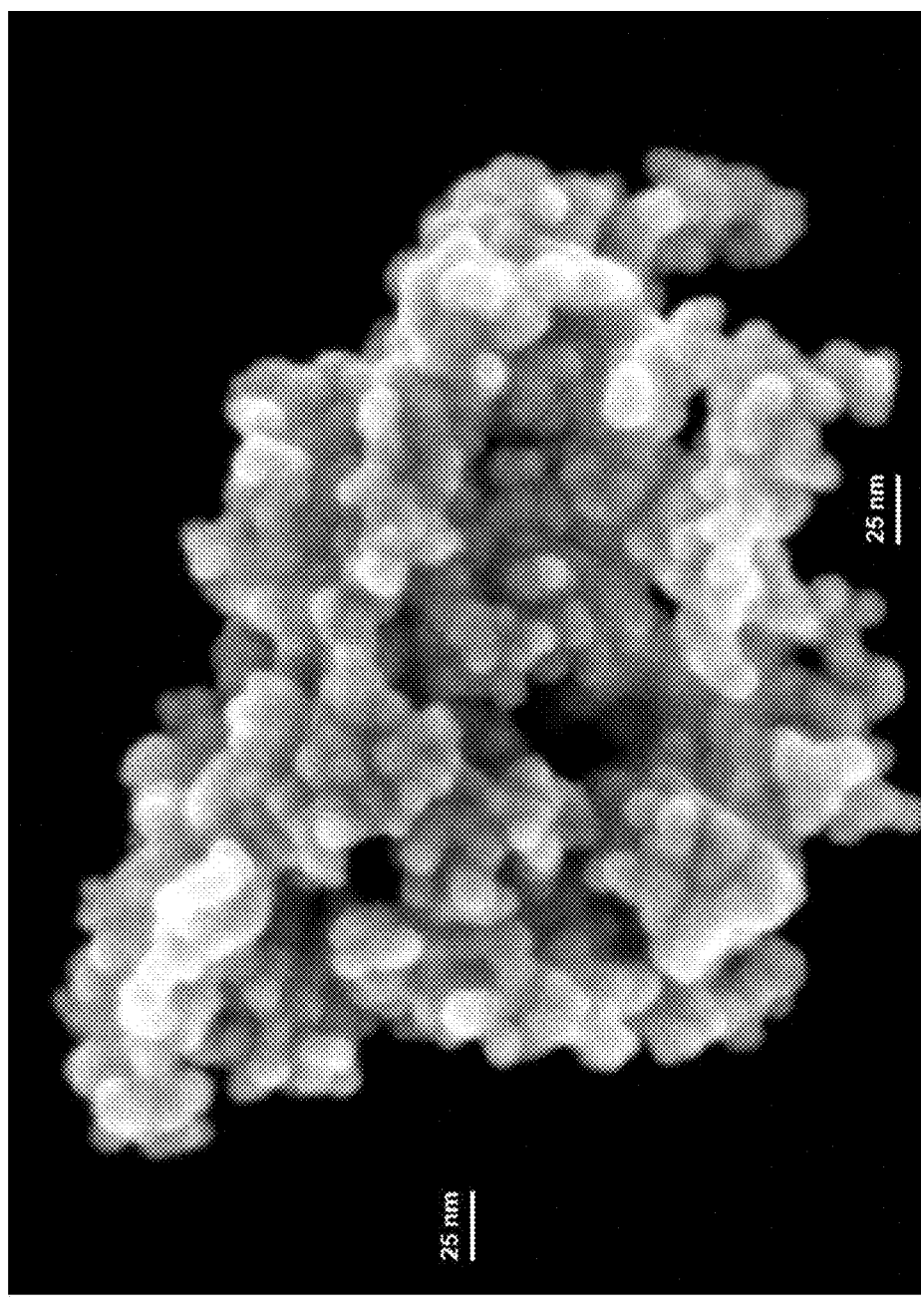
FIG. 6 is a scanning electron microscopy (SEM) image of silica-coated magnetic nanoparticle according to the present technology, at a magnification of 250,000×. The particles were made with 1.5 ml TEOS and sonication.

FIG. 6 is a scanning electron microscopy (SEM) image of silica-coated magnetic nanoparticle according to the present technology, at a magnification of 250,000×. The particles were made with 1.5 ml TEOS and sonication.

Figure 7:
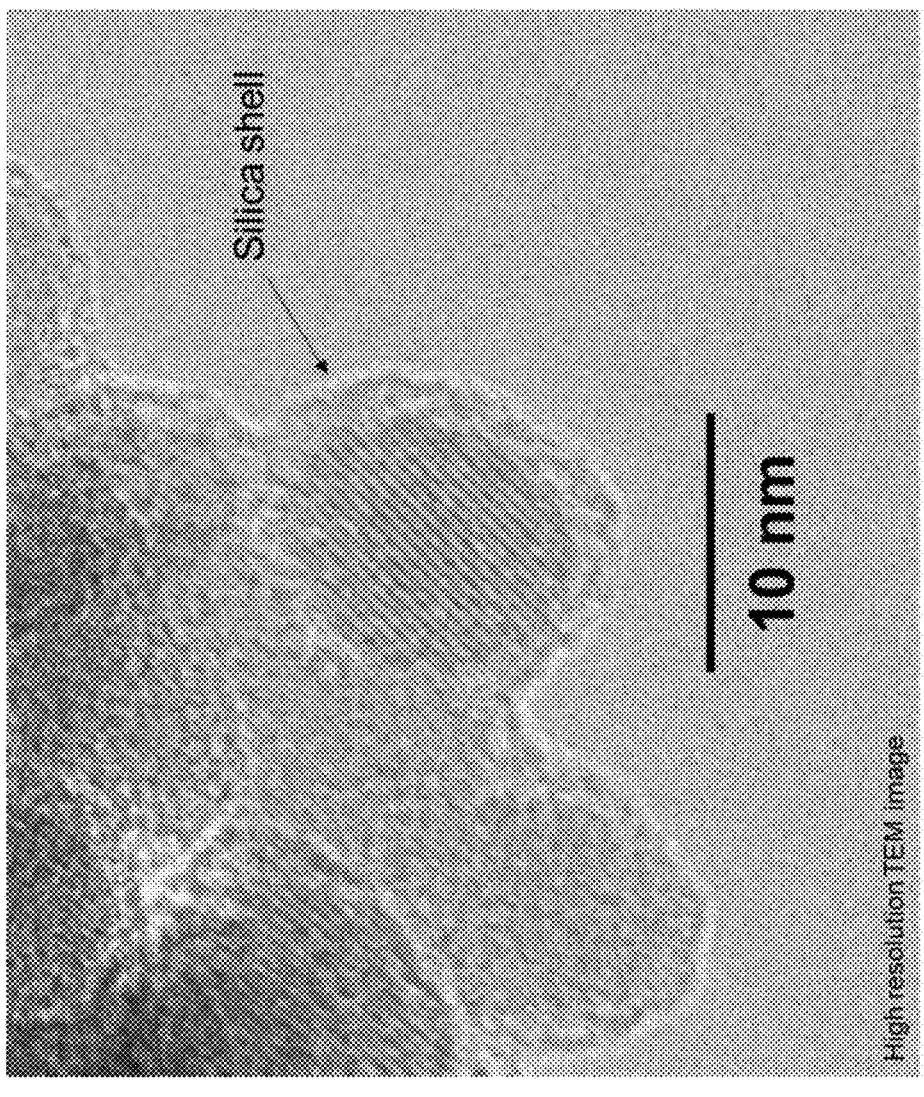
FIG. 7 is a transmission electron microscopy (TEM) image of silica-coated magnetic nanoparticle according to the present technology. Typical $Fe_3O_4$ cores range from 7 to 10 nm. The average silica coating thickness on the particles using 1.5 ml of TEOS was about 1.6 nm. Prominent $Fe_3O_4$ crystalline lattice visible inside core indicates the lack of oxidation during synthesis.

FIG. 7 is a transmission electron microscopy (TEM) image of silica-coated magnetic nanoparticle according to the present technology. Individual silica-coated magnetic nanoparticles are visible. Aggregation of particles is also visible. Typical $Fe_3O_4$ cores range from 7 to 10 nm. The average silica coating thickness on the particles using 1.5 ml of TEOS was about 1.6 nm. A $Fe_3O_4$ crystalline lattice is visible inside core, and this indicates the nanoparticles were not oxidized during synthesis or shipping.

Example 3

In this example, several lots of silica-coated magnetic nanoparticles were prepared following the procedure set forth in Example 1, thereby producing Examples 3-1 to 3-14. The surface areas of several of those examples were determined by Brunauer-Emmett-Teller (BET) surface area, and were found to have surface areas between about 113 $m^2/g$ and about 127 $m^2/g$.

| Example # | Surface Area (m2/g) |
|---|---|
| 3-1 | 113 |
| 3-2 | 116 |
| 3-3 | 127 |
| 3-4 | 120 |
| 3-5 | 122 |
| 3-6 | 122 |
| 3-7 | 125 |
| 3-8 | 116 |
| 3-9 | |
| 3-10 | 120 |
| 3-11 | 113 |

Example 4

In this example, RNA was recovered from a sample using magnetic nanoparticles of the present disclosure in both manual and automated protocols. In these methods, 75 µL aliquots of a biological sample containing RNA were pipetted into 0.2 ml strip tubes. 75 µL guanidine thiocyanate (GTC) containing Lysis Buffer and 2 µL of Proteinase K (20 mg/ml) were added to each tube. The tubes were capped, mixed by vortexing, and spun. The tubes were incubated at 60° C. for 5 minutes. After incubation, 75 µL of 100% EtOH were added to each tube, along with 2 µL of magnetic nanoparticles having a particle size of 10.38 nm, based on a core particle size of 8.82 nm and a coating thickness of 1.56 nm. The tubes were capped, mixed, spun briefly, and incubated for 5 minutes at room temperature. During this second incubation period, RNA from the sample bound to the silica-coated magnetic nanoparticles.

After the second incubation period, the tubes were placed on a magnet for 5 minutes. Then, all supernatants were removed from the tubes without disturbing the NP pellets. 200 µL of washing medium (80% EtOH) was added to the pellets in the tubes. The wash medium was removed without disturbing the NP pellet and the wash and removal steps were repeated. The NP pellet was incubated at room temperature for 3 minutes to dry the nanoparticles.

75 µL of elution medium pre-heated to 65° C. was then added to the tubes and it pipetted up and down several times to mix the nanoparticles while avoiding production of air bubbles. The tubes were allowed to stand for 2 minutes, nanoparticles were captured by a magnet and the eluate containing the RNA was recovered and transferred to a fresh tube. The fresh tube was capped and placed on ice.

Example 5

Figure 8A:
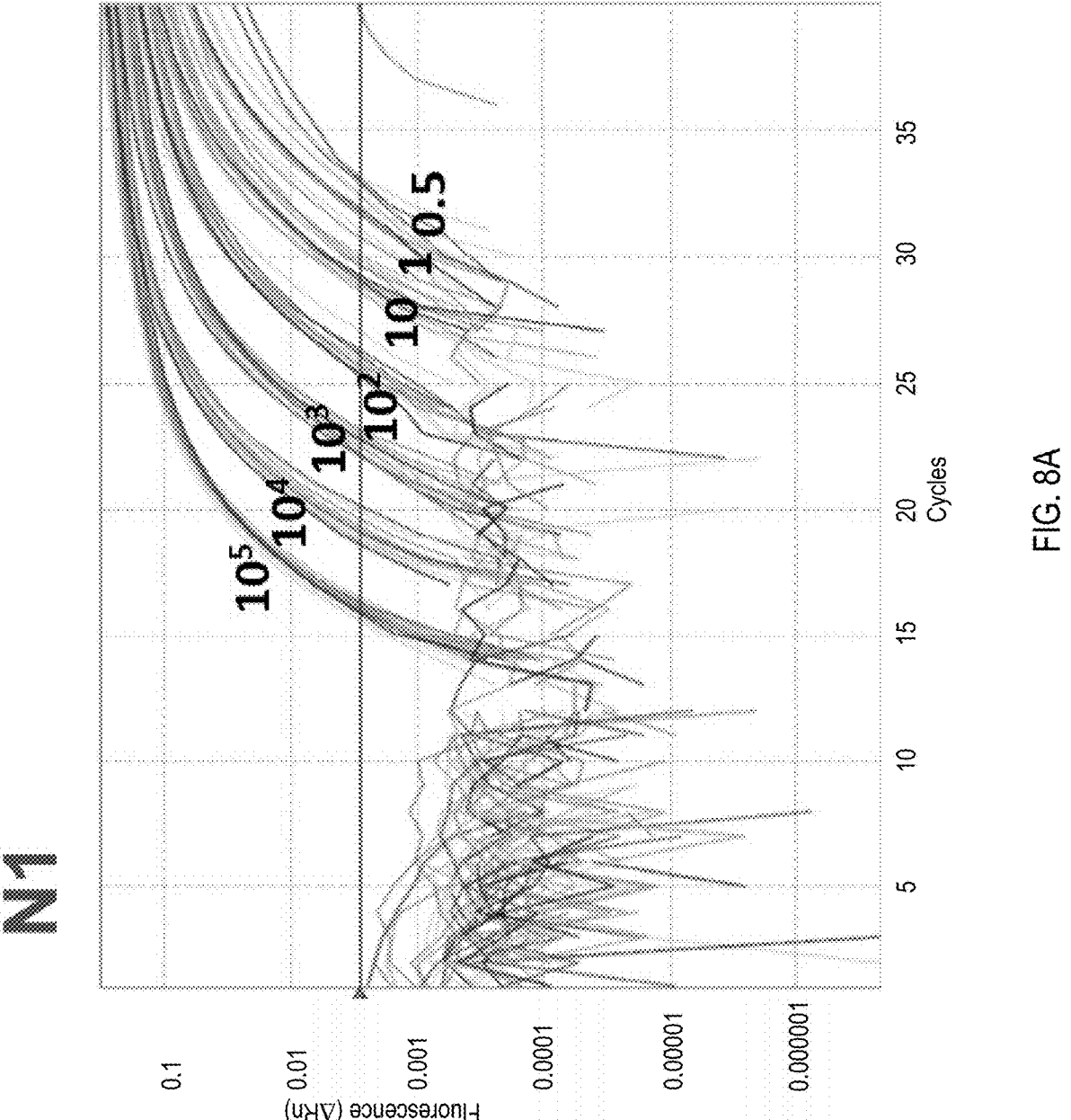
FIGS. 8A through 8F show Diagnostic Quantitative Reverse Transcription Polymerase Chain Reaction (QRT-PCR) results. Using manual (FIGS. 8A to 8C) and automated (FIGS. 8D to 8F) protocols and multiple lots of magnetic silica nanoparticles, viral RNA was recovered from a sample and analyzed by diagnostic QRT-PCR.

In this example, RNA was recovered from a sample using magnetic nanoparticles of the present disclosure in a manual protocol. FIG. 8A provides a comparison of six nanoparticles (NP) lots for viral RNA extraction using the manual workflow.

Contrived samples were prepared by spiking-in SARS-CoV-2 armored synthetic RNA into Nasal Swab (NS) collected into VTM to the final concentrations of SARS-CoV-2 N1 and N2 targets $10^5$, $10^4$, $10^3$, $10^2$, 10, 1 and 0.5 copies per microliter. RNA extraction was performed using 75 ul of each dilution in duplicate following the NAP manual protocol. Shortly, 75 ul of each sample was mixed with 75 ul of the lysis buffer and 2 ul of Proteinase K, incubated at RT for 5 min and at 60° C. for 5 min, then 75 ul of 100% ethanol containing 2 ul of NP beads were added. The following 6 NP lots were used in this experiment: Example 3-3, Example 3-5, Example 3-6, Example 3-7, Example 3-8, and Example 3-9. Samples were mixed and incubated at RT for 5 min to allow nucleic acids bind to magnetic beads, then tubes were transferred to a magnet stand and beads were collected at the bottom side of the tubes (RNA remains bound to magnetic beads at this step). After aspirating the supernatant, beads were washed twice with 80% ethanol, dried for 3 min. at RT and RNA was eluted with 30 ul of Low TE buffer (10 mM Tris, 0.1 mM EDTA, pH 8.0).

Figure 8B:
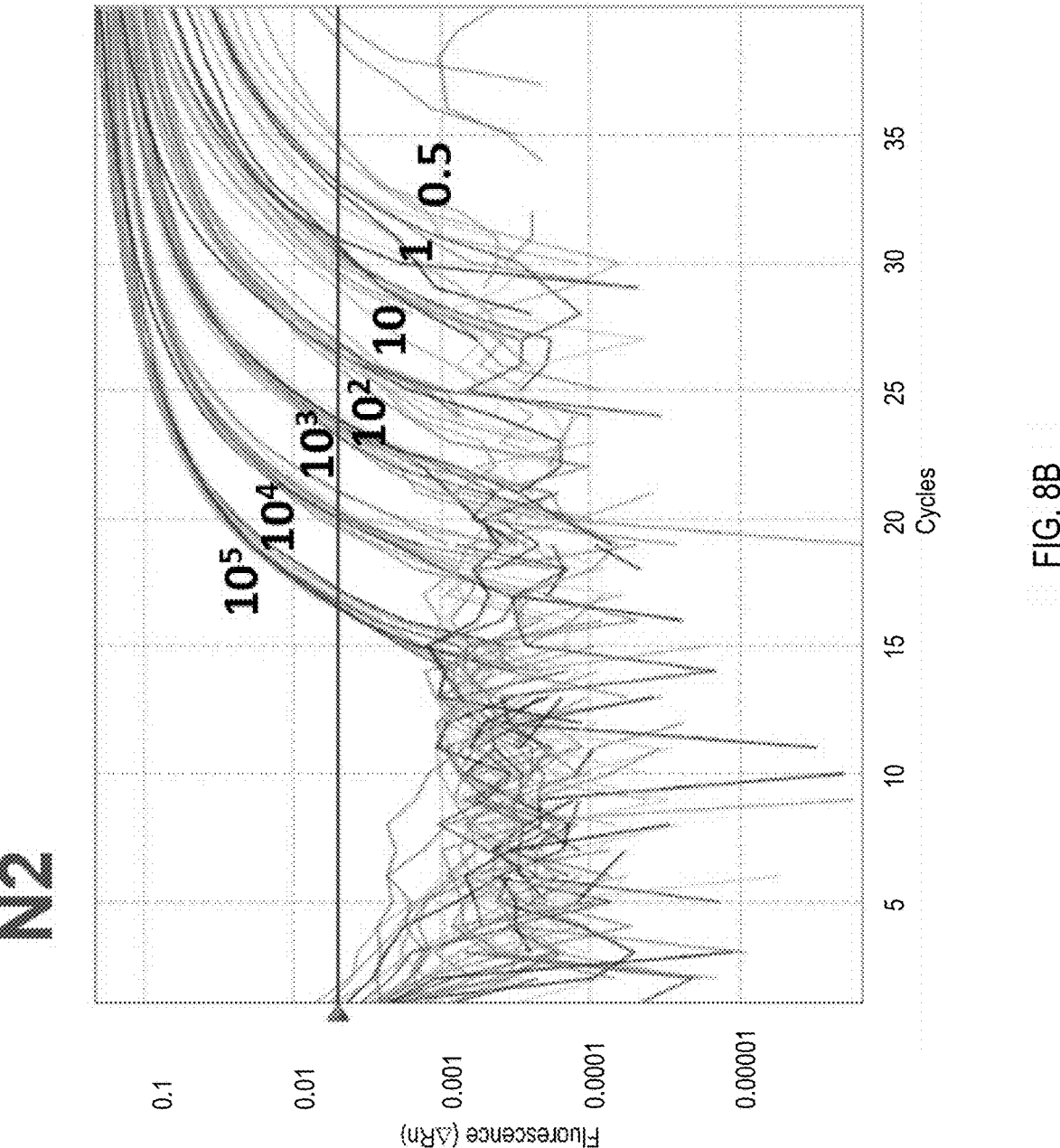
Figure 8C:
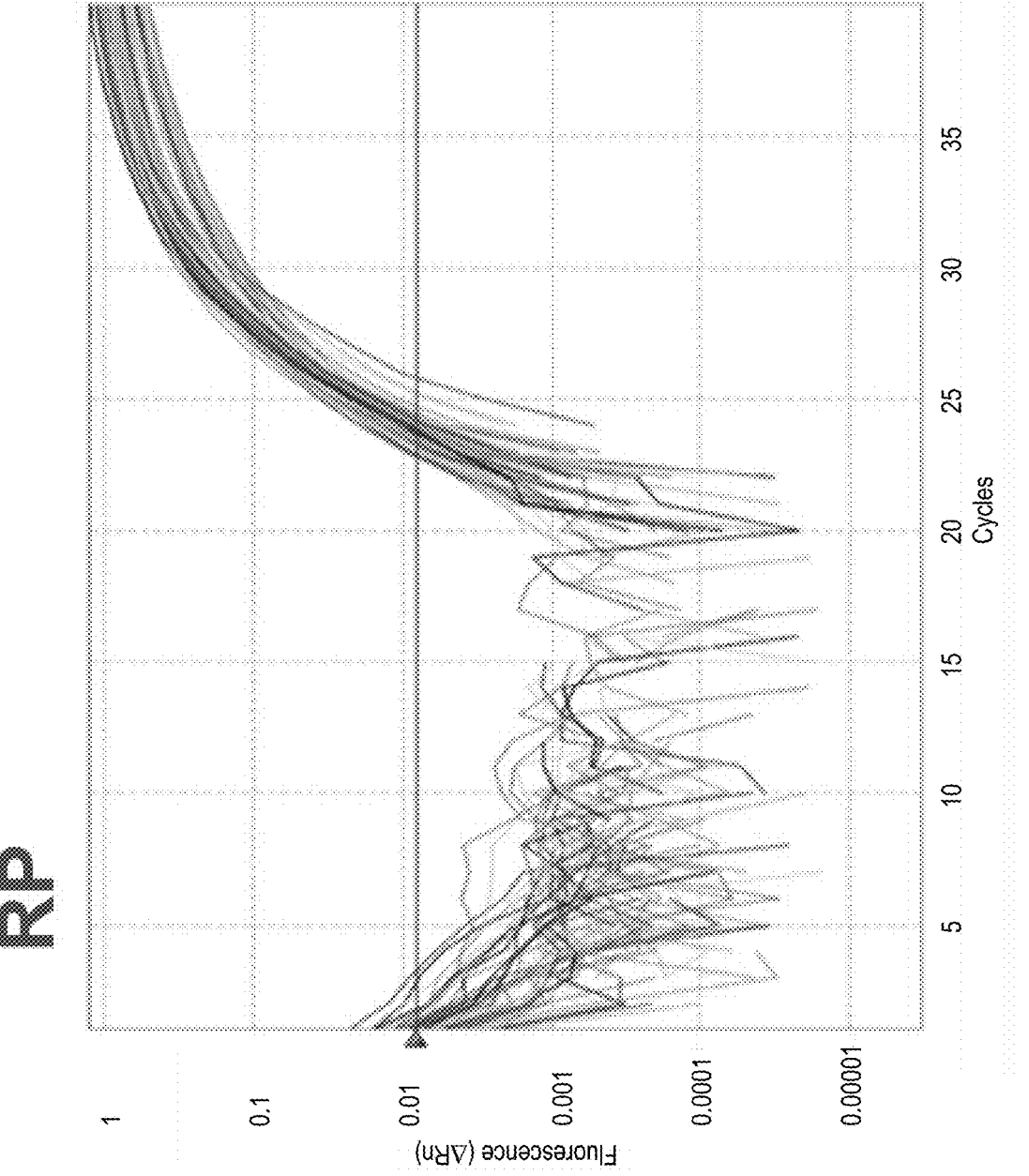

5 ul of each extracted RNA sample were used in multiplex QRT-PCR reactions with primers and probes specific to SARS-CoV-2 N1 and N2 targets and human RNase P gene. The assay was run on the Agilent AriaMx Real-Time PCR system. Amplification curves of N1, N2 and RP targets presented in FIGS. 8A, 8B and 8C and corresponding Cq's presented in Tables A, B and C. No significant difference was observed between six NP lots and QRT-PCR detection of SARS-CoV2 N1 and N2 RNA targets at 10e5–0.5 copies/ul and human RP were demonstrated.

TABLE A

| SARS | N1 Cq ($\Delta$Rn) | | | | | |
|---|---|---|---|---|---|---|
| (copies/uL) | Ex. 3-3 | Ex. 3-5 | Ex. 3-6 | Ex. 3-7 | Ex. 3-8 | Ex. 3-9 |
| 100,000.00 | 16.54 | 16.31 | 16.16 | 16.3 | 16.39 | 16.23 |
| 10,000.00 | 19.74 | 20.15 | 19.25 | 19.47 | 19.3 | 19.29 |
| 1,000.00 | 22.96 | 22.9 | 22.34 | 22.57 | 22.71 | 22.77 |
| 100 | 27.59 | 26.49 | 25.77 | 25.79 | 26.11 | 25.94 |
| 10 | 30.29 | 30.14 | 29.18 | 29.21 | 29.51 | 30.03 |
| 1 | 33.09 | 31.63 | 32.2 | 32.19 | 33.52 | 32.25 |
| 0.5 | 33.29 | 32.24 | 31.46 | 33.54 | 32.85 | 31.62 |
| 0 | No Ct | No Ct | No Ct | No Ct | No Ct | No Ct |

TABLE B

| SARS | N2 Cq ($\Delta$Rn) | | | | | |
|---|---|---|---|---|---|---|
| (copies/uL) | Ex. 3-3 | Ex. 3-5 | Ex. 3-6 | Ex. 3-7 | Ex. 3-8 | Ex. 3-9 |
| 100,000.00 | 16.82 | 16.65 | 16.74 | 16.81 | 16.88 | 17 |
| 10,000.00 | 20.49 | 20.56 | 19.9 | 20.4 | 20.13 | 19.83 |
| 1,000.00 | 23.6 | 23.69 | 23.54 | 23.46 | 23.4 | 23.76 |
| 100 | 27.79 | 27.19 | 26.7 | 26.69 | 26.86 | 26.68 |
| 10 | 31.25 | 30.79 | 30.18 | 29.76 | 30.64 | 30.87 |
| 1 | 35.45 | 33.14 | 34.19 | 33.49 | 34.8 | 34.69 |
| 0.5 | 35.33 | 33.69 | 33.58 | 37.61 | 36.15 | 33.2 |
| 0 | No Ct | No Ct | No Ct | No Ct | No Ct | No Ct |

TABLE C

| SARS | RP Cq ($\Delta$Rn) | | | | | |
|---|---|---|---|---|---|---|
| (copies/uL) | Ex. 3-3 | Ex. 3-5 | Ex. 3-6 | Ex. 3-7 | Ex. 3-8 | Ex. 3-9 |
| 100,000.00 | 23.14 | 22.6 | 22.91 | 22.91 | 23.34 | 23.18 |
| 10,000.00 | 23 | 23.38 | 22.95 | 23.22 | 23.12 | 22.96 |
| 1,000.00 | 23.71 | 23.77 | 23.61 | 23.56 | 23.69 | 23.83 |
| 100 | 25.49 | 24.72 | 23.92 | 23.64 | 24.14 | 24.05 |
| 10 | 24.23 | 24.51 | 24.36 | 24.13 | 23.86 | 23.78 |
| 1 | 23.63 | 24.25 | 24.15 | 23.96 | 23.85 | 23.47 |
| 0.5 | 24.32 | 24.19 | 23.95 | 24.37 | 24.17 | 23.83 |
| 0 | 24.37 | 23.77 | 23.88 | 23.84 | 24.55 | 23.66 |

Example 6

Figure 8D:
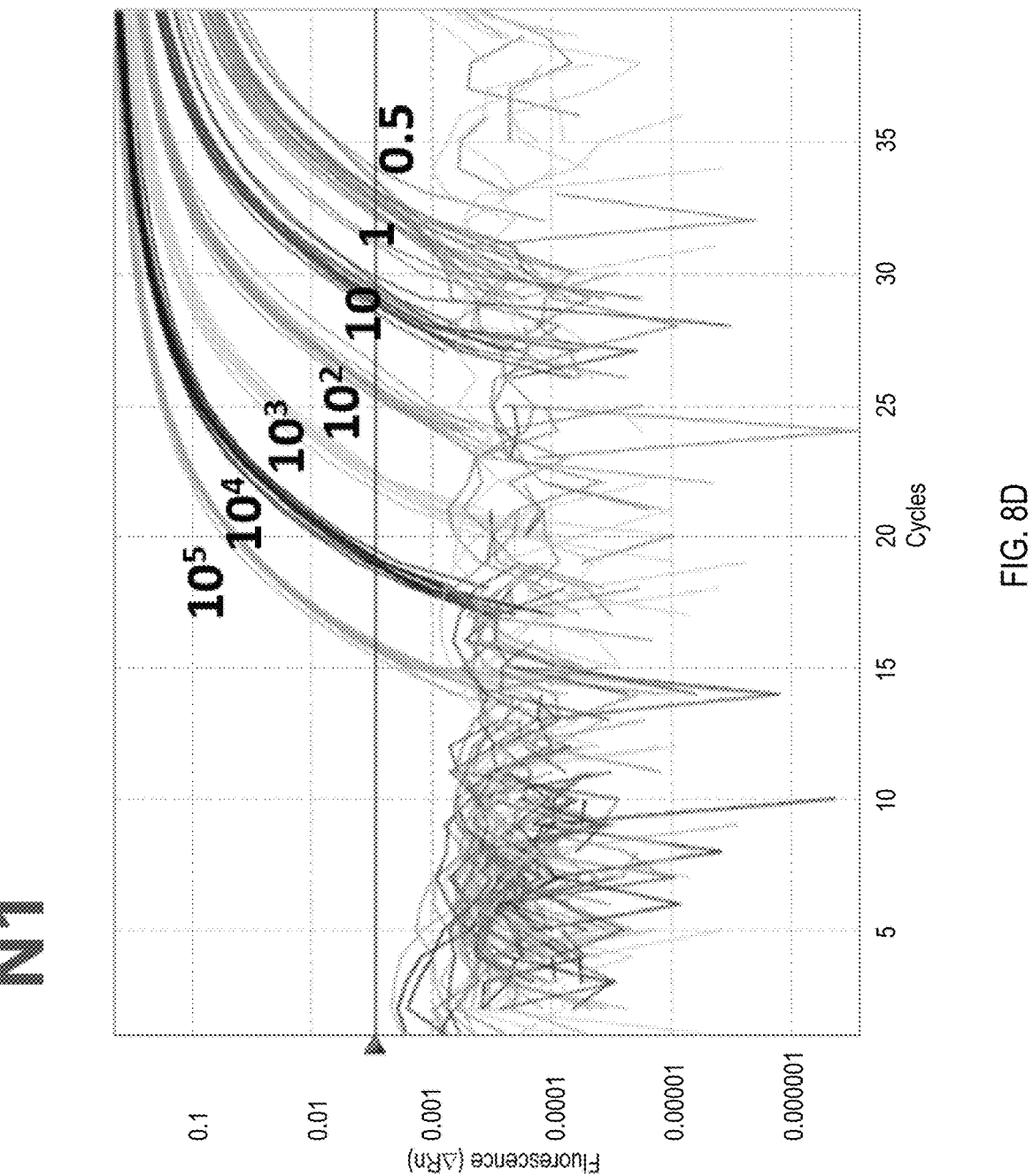
Figure 8E:
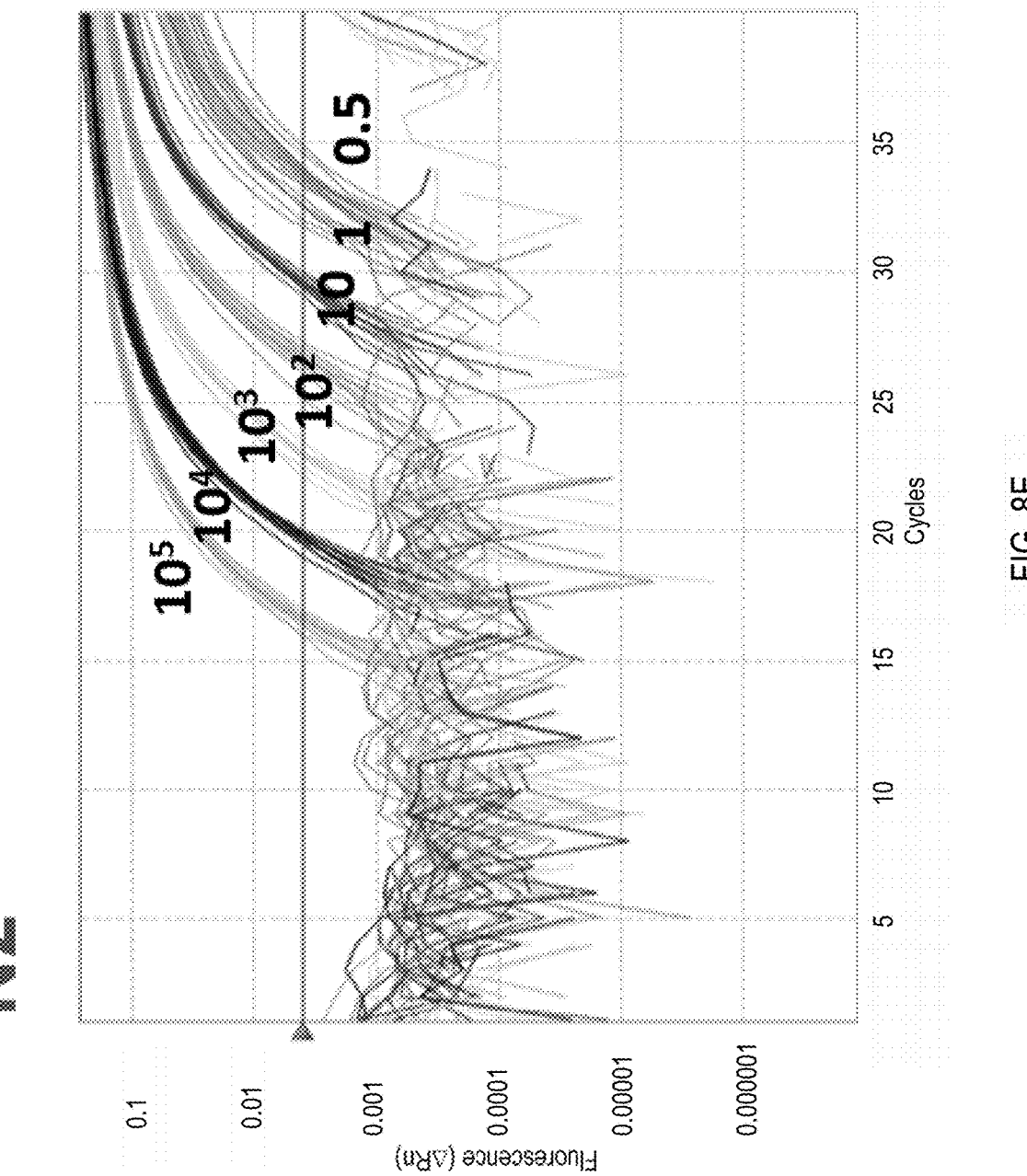
Figure 8F:
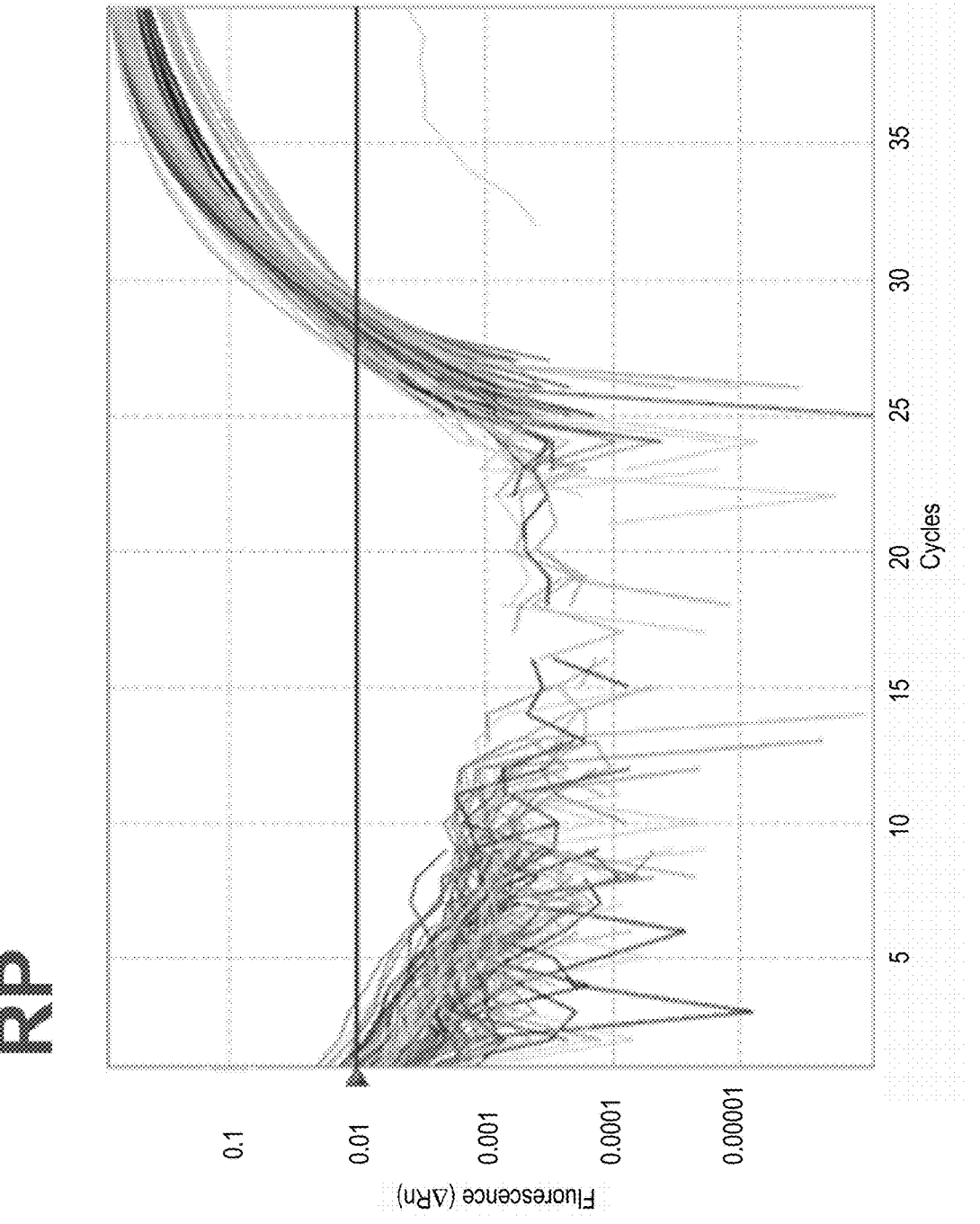

In the following example, RNA was recovered from a sample using magnetic nanoparticles of the present disclosure in an automated protocol. FIGS. 8D, 8E and 8F shows a comparison of six nanoparticles lots for viral RNA extraction using an automation workflow.

Contrived samples were prepared by spiking-in SARS-CoV-2 armored synthetic RNA into Nasal Swab (NS) collected into VTM to the final concentrations of SARS-CoV-2 N1 and N2 targets $10^5$, $10^4$, $10^1$, $10^2$, 10, 1 and 0.5 copies per microliter. RNA extraction was performed using 75 ul of each dilution. Shortly, 75 ul of each sample was mixed with 75 ul of the lysis buffer and 2 ul of Proteinase K, incubated at RT for 5 min and then transferred into the Bravo instrument for an automatic processing. The following NP lots were used in this experiment: Example 3-2, Example 3-3 (from two different vials, designated 3-3a and 3-3b), Example 3-4, Example 3-5, and Example 1-1B. RNA was eluted with 30 ul of Low TE buffer (10 mM Tris, 0.1 mM EDTA, pH 8.0).

5 ul of each extracted RNA sample were used in multiplex QRT-PCR reaction with primers and probes specific to SARS-CoV-2 N1 and N2 targets and human RNase P gene. The assay was run on the Agilent AriaMx Real-Time PCR system. Amplification curves of N1, N2 and RP targets presented in FIGS. 8D, 8E and 8F and corresponding Cq's presented in Tables D, E and F. No significant differences were observed between six NP lots and QRT-PCR detection of SARS-CoV2 N1 and N2 RNA targets at $10^5$ —0.5 copies/ul and human RP were demonstrated.

TABLE D

| SARS | N1 Cq ($\Delta$Rn) | | | | | |
|---|---|---|---|---|---|---|
| (copies/uL) | Ex. 3-2 | Ex. 3-3a | Ex. 3-4 | Ex. 3-5 | Ex. 1-1B | Ex. 3-3b |
| 100,000.00 | 15.88 | 17.79 | 15.92 | 15.68 | 15.66 | 15.69 |
| 10,000.00 | 19.22 | 19.32 | 19.00 | 18.95 | 18.83 | 19.02 |
| 1,000.00 | 22.42 | 22.54 | 22.30 | 23.01 | 21.93 | 22.04 |
| 100.00 | 25.68 | 25.83 | 26.60 | 25.96 | 25.67 | 25.40 |
| 10.00 | 29.02 | 29.41 | 29.12 | 28.68 | 29.53 | 29.14 |
| 1.00 | 32.85 | 31.85 | 31.80 | 32.65 | 32.94 | 32.76 |
| 0.5 | No Ct | 33.36 | 34.03 | 33.18 | 33.37 | 32.72 |
| 0 | No Ct | No Ct | No Ct | No Ct | No Ct | No Ct |

TABLE E

| SARS | N2 Cq ($\Delta$Rn) | | | | | |
|---|---|---|---|---|---|---|
| (copies/uL) | Ex. 3-2 | Ex. 3-3a | Ex. 3-4 | Ex. 3-5 | Ex. 1-1B | Ex. 3-3b |
| 100,000.00 | 16.60 | 27.46 | 16.89 | 16.74 | 16.42 | 16.28 |
| 10,000.00 | 19.84 | 19.91 | 19.90 | 19.84 | 19.59 | 19.81 |
| 1,000.00 | 23.19 | 23.43 | 23.13 | 23.79 | 22.88 | 22.64 |
| 100.00 | 27.03 | 27.02 | 27.93 | 26.87 | 26.59 | 26.07 |
| 10.00 | 29.67 | 29.72 | 29.63 | 29.44 | 29.92 | 29.80 |
| 1.00 | 33.40 | 33.22 | 32.97 | 32.45 | 34.28 | 33.77 |
| 0.5 | 34.76 | 34.17 | 33.95 | 34.12 | 34.08 | 33.31 |
| 0 | No Ct | No Ct | No Ct | No Ct | No Ct | No Ct |

TABLE F

| SARS | RP Cq ($\Delta$Rn) | | | | | |
|---|---|---|---|---|---|---|
| (copies/uL) | Ex. 3-2 | Ex. 3-3a | Ex. 3-4 | Ex. 3-5 | Ex. 1-1B | Ex. 3-3b |
| 100,000.00 | 28.72 | 28.78 | 28.97 | 28.89 | 28.96 | 29.31 |
| 10,000.00 | 27.77 | 28.03 | 27.93 | 27.82 | 28.00 | 27.60 |
| 1,000.00 | 27.96 | 27.52 | 27.85 | 27.98 | 27.65 | 27.50 |
| 100.00 | 28.44 | 28.63 | 27.93 | 28.54 | 28.44 | 28.14 |
| 10.00 | 28.51 | 28.96 | 28.68 | 28.47 | 28.44 | 29.03 |
| 1.00 | 28.88 | 28.52 | 28.91 | 28.71 | 29.06 | 28.71 |
| 0.5 | 29.01 | 29.01 | 29.20 | 29.02 | 28.98 | 28.98 |
| 0 | 28.13 | 28.72 | 28.78 | 29.28 | 28.85 | 29.32 |

Example 7

In the following example, DNA samples destined for Next Generation Sequencing, referred to as "libraries", having different concentrations were "normalized", meaning that regardless of the DNA concentration to which magnetic silica nanoparticles were exposed, all resulting DNA concentrations following normalization possessed approximately equal concentrations.

The following steps were all performed at 4° C.

Add 10 μL (0.1 μg/mL; 1 μg) of magnetic nanoparticles and 60 μL of DNA binding medium into tubes A1-H1 (nanoparticles lot CS-019A) and A2-H2 (nanoparticles CS-019B) and mix by pipetting.

Add 20 μL of 10 nM DNA libraries into tubes A1-D1 and A2-D2 and 20 μL of 100 nM DNA libraries into tubes E1-H1 and E2-H2, mix by pipetting and immediately capture the particles.

Wash the captured particles once with 150 μL of 80% EtOH, remove supernatants, dry particles, add 10 μL of 10 mM Tris-0.1 mM EDTA (pH 8.0), mix, immediately capture particles and perform electrophoretic analysis (HSD1000 TapeStation) on the supernatants.

Figure 9:
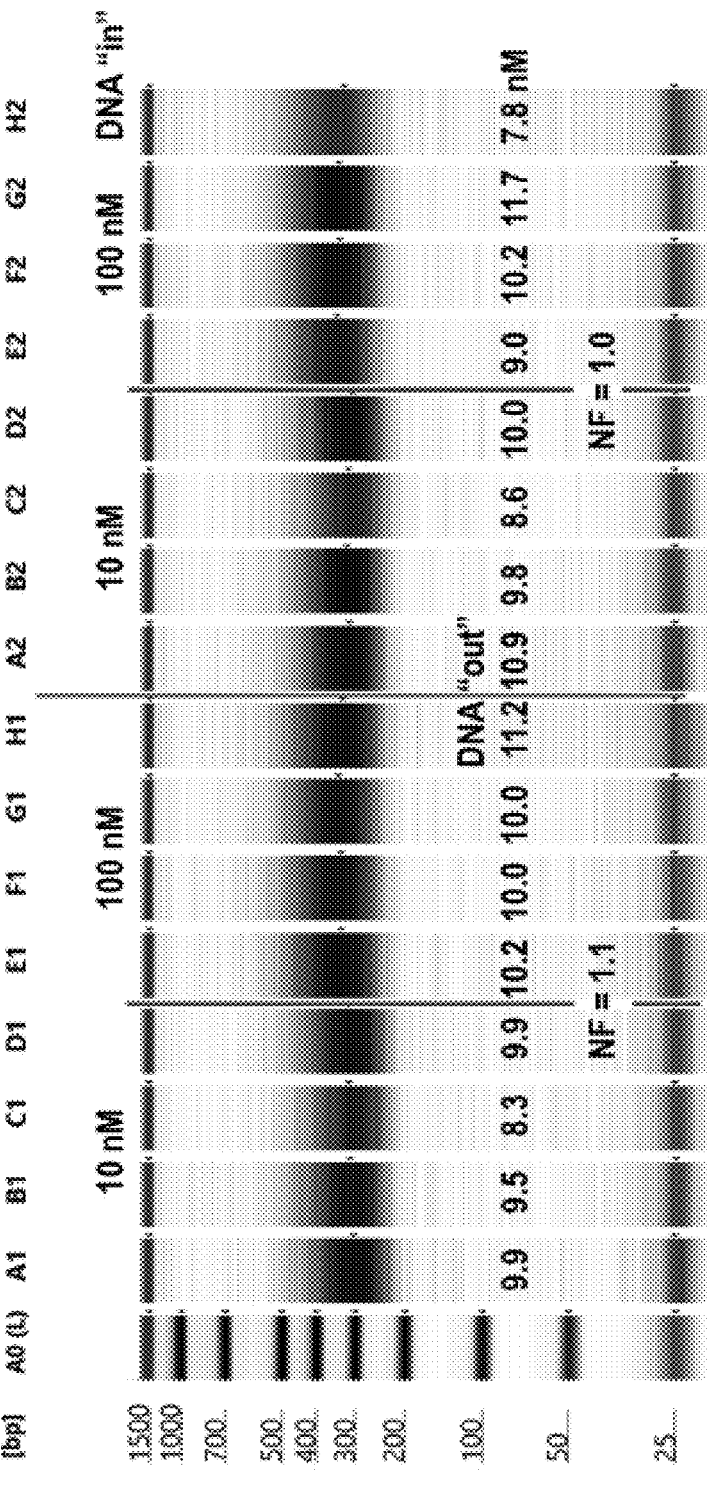
FIG. 9 shows Next Generation Sequence related "Normalization" results. The data presented is electrophoresis verification that normalization, as defined below, is accomplished.
Figure 10:
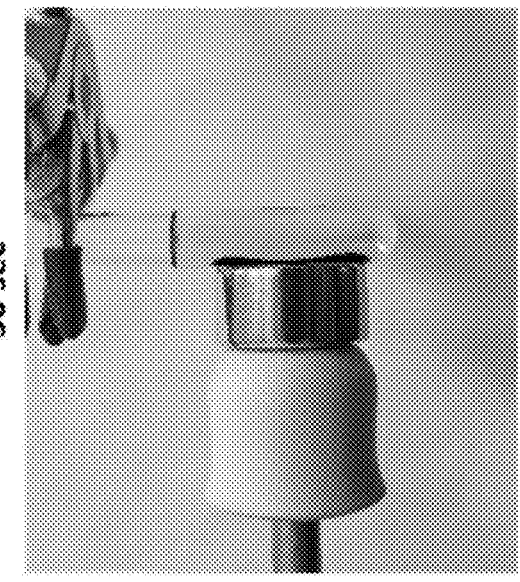
FIG. 10 provides photographs of the magnetic separation of silica-coated magnetic nanoparticles from a stable suspension using a small magnet.
Figure 10:
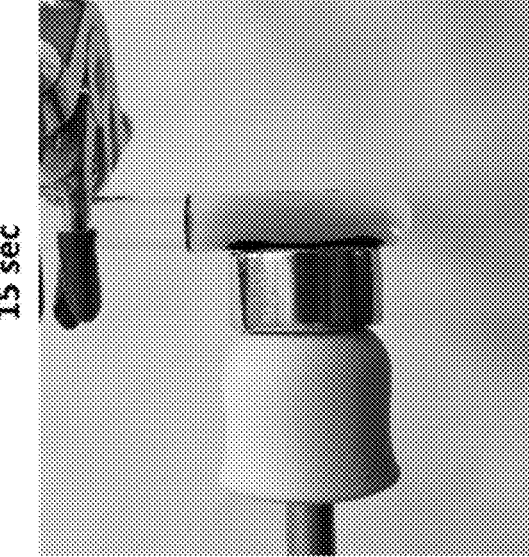
Figure 10:
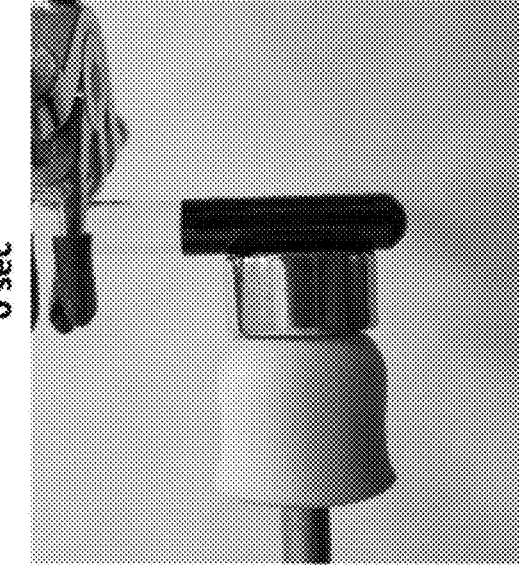

FIG. 9 shows the results of TapeStation analysis. Despite different concentrations of nucleic acid in the DNA libraries used as inputs for the normalization method, Normalization Factors were 1.1 for CS-019A and 1.0 for CS-019B. Average DNA concentrations from tubes A1 to D1 and E1-H1 (CS-019A) were 9.4 nM and 10.4 nM, respectively. 10.4 divided by 9.4 results in a normalization factor of essentially 1.1. Average DNA concentrations from tubes A2 to D2 and E2 to H2 (CS-019B) were 9.8 nM and 9.7 nM, respectively. 9.8 divided by 9.7 results in a normalization factor of essentially 1.0.

In view of this disclosure it is noted that the present methods, compositions, and systems can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

What is claimed is:

1. A method of making silica-coated magnetic nanoparticles comprising:

preparing an aqueous solution of $Fe^{+3}$ and $Fe^{+2}$ ions in deionized, de-oxygenated water in a $Fe^{3+}/Fe^{2+}$ molar ratio of about 2/1;

sonicating the aqueous solution;

adding a base to the aqueous solution to precipitate $Fe_3O_4$ nanoparticles from the aqueous solution, thereby forming a mixture comprising $Fe_3O_4$ nanoparticles in an alkaline water;

removing substantially all the alkaline water from the $Fe_3O_4$ nanoparticles to form a concentrated mixture;

adding a de-oxygenated alcohol to the concentrated mixture to form an aqueous alcohol mixture;

adding a silicate solution to the aqueous alcohol mixture to form a silica coating on the $Fe_3O_4$ nanoparticles; and separating the silica-coated $Fe_3O_4$ nanoparticles from the silicate-containing aqueous alcohol mixture.

2. The method of claim 1, wherein the base added to the aqueous solution comprises ammonia or sodium hydroxide.

3. The method of claim 1, wherein the silicate solution added to the aqueous alcohol mixture comprises tetraethyl orthosilicate (TEOS).

4. The method of claim 1, wherein the addition of the base to the aqueous solution or the addition of the silicate solution to the aqueous alcohol mixture is performed under an inert atmosphere.

* * * * *